United States Patent
Porter et al.

(10) Patent No.: US 6,180,698 B1
(45) Date of Patent: Jan. 30, 2001

(54) POLYCARBONATE-CONTAINING LIQUID CHEMICAL FORMULATION AND METHOD FOR MAKING POLYCARBONATE FILM

(75) Inventors: John D. Porter, Berkeley; Scott J. Crane, Prunedale; Stephanie J. Oberg, Sunnyvale; Anthony W. Johnson, Fremont, all of CA (US)

(73) Assignees: Candescent Technologies Corporation, San Jose; Hewlett-Packard Company, Palo Alto, both of CA (US)

(*) Notice: Under 35 U.S.C. 154(b), the term of this patent shall be extended for 0 days.

(21) Appl. No.: 08/808,363

(22) Filed: Feb. 28, 1997

(51) Int. Cl.[7] .............................. C08K 5/34; C08K 5/35; C08K 5/15; C08K 5/02
(52) U.S. Cl. .............................. 524/94; 524/104; 524/99; 524/114; 524/464
(58) Field of Search .............................. 524/94, 99, 104, 524/114, 360, 464

(56) References Cited

U.S. PATENT DOCUMENTS

| | | | |
|---|---|---|---|
| 3,303,085 | * 2/1967 | Price et al. | 206/150 |
| 4,791,016 | 12/1988 | Schulte et al. | 428/220 |
| 5,084,550 | 1/1992 | Pakull et al. | 528/204 |
| 5,266,617 | * 11/1993 | Han | 524/392 |
| 5,468,324 | 11/1995 | Hong | 156/247 |
| 5,559,389 | 9/1996 | Spindt et al. | 313/310 |
| 5,564,959 | 10/1996 | Spindt et al. | 445/24 |

FOREIGN PATENT DOCUMENTS

| | | | |
|---|---|---|---|
| 27 01 173 A1 | 7/1978 | (DE) . | |
| 0 084 578 A1 | 8/1983 | (EP) . | |
| 0 141 310 A2 | 5/1985 | (EP) . | |
| 0 141 310 B1 | 5/1985 | (EP) . | |
| 0 380 028 A2 | 8/1990 | (EP) . | |
| 0 380 028 A3 | 8/1990 | (EP) . | |
| 500128B1 | 8/1992 | (EP) | C08J/5/18 |
| 1122003 | 7/1968 | (GB) . | |
| 1592724 | 7/1981 | (GB) . | |
| WO 90/05203 | 5/1990 | (WO) | C23C/18/22 |
| WO 94/28569 | 12/1994 | (WO) . | |
| WO 95/07543 | 3/1995 | (WO) . | |

OTHER PUBLICATIONS

*The Condensed Chemical Dictionary* (10th ed., Van Nostrand Reinhold Co.), 1981, p. 872.

Apai et al, "Surface Analysis of Polycarbonate Thin Films by High-Resolution Electron Energy Loss Spectroscopy: Negative Ion Resonances and Surface Vibrations," *Langmuir*, vol. 7, 1991, pp. 2266–2272.

Blunt et al, "Production of thin metallised plastic films," *Nucl. Instr. and Meth. in Phys. Res. A*, vol. 334, 1993, pp. 251–253.

Bosch, "A charge and energy study of the track response of Lexan," *Nucl. Instr. and Meth. in Phys. Res. B*, vol. 84, 1994, pp. 357–360.

Bosch et al, "A study of the dependence of the bulk etch rate and the reduced etch rate on the concentration of etched products of Lexan," *Nucl. Instr. and Meth. in Phys. Res. B*, vol. 93, 1994, pp. 57–62.

Busta, "Vacuum Microelectronics—1992," *J. Micromech. Microeng.* vol. 2, 1992, pp. 43–74.

Cowie, *Polymers: Chemistry & Physics Of Modern Materials*, (2d ed., Blackie Academic & Professional), 1991, pp. 1–25, 157–213, and 247–273.

Fischer et al, "Production and use of nuclear tracks: imprinting structure on solids," *Reviews of Modern Physics*, vol. 55, No. 4, Oct. 1983, pp. 907–948.

Hoffman, "Inorganic membrane filter for analytical separations," *American Laboratory*, Aug. 1989, pp. 70–73.

Hosokawa et al, "Bright blue electroluminescence from hole transporting polycarbonate," *Appl. Phys. Lett.*, vol. 61, No. 21, Nov. 23, 1992, pp. 2503–2505.

Huizenga, et al, "Submicron entrance window for an ultrasoft x-ray camera," *Rev. Sci. Instrum.*, vol. 52, No. 5, May 1981, pp. 673–677.

Kent, "EUV Band Pass Filters for the ROSAT Wide Field Camera," *Proceedings, SPIE*, vol. 1344, 1990, pp. 255–266.

Nakamura et al, "Photocurrent of Solution-Grown Thin Polycarbonate Films Containing Soluble Nickel-Phthalcyanine," *Japanese Journal of Applied Physics*, vol. 28, No. 6, Jun. 1989, pp. 991–995.

Shriver et al, *The Manipulation of Air-Sensitive Compounds* (2d ed., John Wiley & Sons) 1986, pp. 84–96.

Spohr, *Ion Tracks and Microtechnology, Principles and Applications* (Viewig), edited by K. Bethge, 1990, pp. 246–255.

Stevens, *Polymer Chemistry, An Introduction*, (2d ed., Oxford University Press), 1990, pp. 28, 344, 345, 394, 395, and 400–403.

(List continued on next page.)

Primary Examiner—Kriellion S. Morgan
Assistant Examiner—B. Cole
(74) Attorney, Agent, or Firm—Skjerven, Morrill, MacPherson, Franklin and Friel LLP; Ronald J. Meetin

(57) ABSTRACT

A liquid chemical formulation suitable for making a thin solid polycarbonate film of highly uniform thickness is formed with polycarbonate material, a liquid that dissolves the polycarbonate, and possibly one or more other constituents. The liquid is typically capable of dissolving the polycarbonate to a concentration of at least 1% at 20° C. and 1 atmosphere. The liquid also typically has a boiling point of at least 80° C. at 1 atmosphere. Examples of the liquid include pyridine, a ring-substituted pyridine derivative, pyrrole, a ring-substituted pyrrole derivative, pyrrolidine, a pyrrolidine derivative, and cyclohexanone. In forming the polycarbonate-containing film, a liquid film (36A) of the liquid chemical formulation is formed over a substructure (30). The liquid film is processed to largely remove the liquid and convert the polycarbonate into a solid film (38).

98 Claims, 5 Drawing Sheets

OTHER PUBLICATIONS

Stoner, "Casting thin films of cellulose nitrate, polycarbonate, and polypropylene," *Nucl. Instr. and Meth. in Phys. Res. A*, vol. 362, 1995, pp. 167–174.

Su, "Comparison of Chemical Etching with the Alkali–Alcohol Mixture and the Ultrasonic Etchings of Fission Fragment and Alpha Particle Tracks in Lexan Polycarbonates," *Radiation Effects and Defects in Solids*, vol. 114, 1990, pp. 157–166.

"Handling air–sensitive reagents," *Tech. Bull. AL–134*, Aldrich Chemical Co., Dec. 1994, 8 pages.

"Instruments for Research, Industry, and Education," catalog, Cole–Parmer Instrument Co., 1991–1992, pp. 663–665, 772, and 773.

1990 Nuclepore Laboratory Products Catalog, 1990, cover p. and pp. 3, 8, and 9.

*CRC Handbook of Chemistry and Physics*, (65th edition, CRC Press), 1984, pp. C–137, C–541, C–572, and C–573.

* cited by examiner

POLYCARBONATE-CONTAINING LIQUID CHEMICAL FORMULATION AND METHOD FOR MAKING POLYCARBONATE FILM

CROSS REFERENCE TO RELATED APPLICATION

This is related to Porter et al, co-filed U.S. patent application Ser. No. 08/807,456, now U.S. Pat. No. 5,914,150. To the extent not repeated herein, the contents of Ser. No. 08/807,456, now U.S. Pat. No. 5,914,150 are incorporated by reference herein.

FIELD OF USE

This invention relates to the formation of thin polycarbonate films.

BACKGROUND ART

Polycarbonate is a colorless thermoplastic polymer, i.e., polycarbonate softens when heated and hardens when cooled. Polycarbonate is commonly used in applications which take advantage of its outstanding impact resistance and toughness, such as molded helmets, battery cases, bottles and packaging, and in applications which also demand optical transparency, such as bullet-proof and safety glass, eyewear, compact discs and automobile lenses. In thin-film form, polycarbonate is used for a variety of applications ranging from precision filters to electron-emitting devices.

Polycarbonate membranes used as commercial filters are described in the 1990 *Nucleopore® Laboratory Products Catalog*, Costar Corp., 1990, pp. 3, 8 and 9. The membranes are created by subjecting stretched, crystalline polycarbonate film to irradiation, followed by etching to form pores. The Costar process is similar to that disclosed in Price et al., U.S. Pat. No. 3,303,085. The thickness of commercial membrane filters is typically 6 to 11 $\mu$m.

Bassiere et al., PCT Patent Publication WO 94/28569, disclose how thin polycarbonate layers are used in manufacturing electron-emitting devices. In one embodiment, Bassiere et al. provide a polycarbonate layer over a sandwich consisting of an upper conductor, an insulator and a patterned lower conductor. The multi-layer structure is irradiated with heavy ions to create radiation tracks through the polycarbonate layer. The tracks are etched to form pores through the polycarbonate layer down to the upper conductor. Using suitable etchants, the pore pattern in the polycarbonate layer is transferred to the upper conductor and then to the insulator, after which conical electron-emissive elements are formed in the resulting openings in the insulator.

Bassiere et al. indicate that the thickness of their polycarbonate layer is approximately 2 $\mu$m. This is significantly less than the thickness of the commercial polycarbonate membrane filters in the Costar product catalog. While Bassiere et al. specify that the polycarbonate layer in their structure can be created by spin coating, Bassiere et al. do not provide any further information on how to make the polycarbonate layer.

Macaulay et al., PCT Patent Publication WO 95/07543, disclose a similar fabrication technique in which electron-emissive features in an electron-emitting device are defined by way of charged-particle tracks formed in a track layer. Polycarbonate is one of the materials that Macaulay et al. consider for the track layer. The thickness of the track layer in Macaulay et al. is 0.1 to 2 $\mu$m, typically 1 $\mu$m. Consequently, the thickness of the track layer in Macaulay et al. is typically less than that of the polycarbonate layer in Bassiere et al. by a factor of up to twenty.

As film thickness is reduced, it becomes progressively more difficult to make high-quality polycarbonate films. Controlling and maintaining the uniformity of film thickness and other properties, such as density, becomes harder. Structural and compositional defects also become more problematic in very thin polycarbonate films. In fabricating electron emitters, it would be desirable to have a process for making a thin polycarbonate film whose thickness and other physical properties are highly uniform, especially for film thicknesses in the range of 0.1 to 2 $\mu$m.

GENERAL DISCLOSURE OF THE INVENTION

The present invention centers around the preparation of polycarbonate films. More particularly, the invention provides properties and compositions for a polycarbonate-containing liquid chemical formulation from which a thin polycarbonate film of highly uniform thickness can be made. The invention also furnishes processing techniques for making polycarbonate films, along with intermediate structures used in creating polycarbonate films.

In accordance with the invention, a liquid chemical formulation suitable for making a polycarbonate film is formed with polycarbonate material dissolved in an appropriate liquid. In addition to the liquid and the polycarbonate, the present liquid chemical formulation may have one or more other constituents such as a surfactant or an adhesive or adhesion promoter, with each other such constituent typically being present in a lower mass fraction than the mass fraction of the polycarbonate material. The polycarbonate-containing liquid chemical formulation of the invention can be constituted in various ways.

In accordance with the invention, the polycarbonate-dissolving liquid used in the present liquid chemical formulation has the following properties. The minimum solubility of the polycarbonate material in the liquid is 1% by mass at a temperature of 20° C. and a pressure of 1 atmosphere. The boiling point of the liquid is at least 80° C. at 1 atmosphere. Also, the boiling point of the liquid is preferably no greater than ($T_g$+15° C.) at a pressure of approximately 0.001 atmosphere, where $T_g$ is the glass transition temperature of the polycarbonate material. The protonated form of the liquid is normally a sufficiently strong Bronsted acid, i.e., a proton donor, in aqueous solution that the acid dissociation constant of the protonated liquid in aqueous solution exceeds $10^{-8}$ at 20° C. and 1 atmosphere.

The polycarbonate can form up to 50% by mass of the liquid chemical formulation. The molecular weight of the polycarbonate is usually at least 10,000, preferably 30,000 to 35,000. At 20° C. and 1 atmosphere, the liquid formulation of the invention typically has a kinematic viscosity of no more than 100 centistokes, preferably 2 to 25 centistokes when the solution is used for spin coating.

By arranging for the polycarbonate, the polycarbonate-dissolving liquid and the liquid chemical formulation to have the foregoing properties, the liquid formulation is especially suitable for making polycarbonate films whose thickness is 0.1 to 2 $\mu$m.

Various polycarbonate solvents may be used to form the polycarbonate-dissolving liquid in the liquid chemical formulation of the invention. For example, the liquid can be formed with pyridine or/and a ring-substituted pyridine derivative. Alternatively, or additionally, the liquid may include pyrrole, a ring-substituted pyrrole derivative, pyrrolidine, or/and a pyrrolidine derivative. Furthermore, the liquid may alternatively or additionally include chlorobenzene or/and cyclohexanone. When constituted with any of these polycarbonate solvents, the liquid preferably has the polycarbonate-solubility, minimum boiling-point and Bronsted acid characteristics given above.

The manufacture of a polycarbonate film in accordance with the invention is accomplished by first providing a polycarbonate-containing liquid chemical formulation of the above type. A liquid film of the formulation is formed over a substructure to create an intermediate structure in accordance with the invention. The liquid film is typically produced by spin coating. The liquid film is further processed to remove volatile components. The material remaining after such processing is the solid polycarbonate film. Depending on the constituency of the liquid chemical formulation, the polycarbonate film may include, as minor components, one or more other non-volatile constituents of the liquid formulation and/or their reaction products.

In utilizing the invention's teachings to produce polycarbonate films of thickness in the range of 0.1 to 2 $\mu$m, the film thickness is highly uniform. For example, comparing film thicknesses at any two points on a planar substructure separated by up to 10 cm, the total percentage deviation in thickness from a perfectly uniform film is normally less than 10% (i.e., less than ±5%) and is typically less than 5% (i.e., less than ±2.5%). This amounts to a maximum point-to-point thickness variation of less than ±50 nm, typically less than ±25 nm, for a polycarbonate film of 500-nm mean thickness. The invention thus provides a substantial technological advance over the prior art.

When a polycarbonate film serves as a track layer in fabricating an electron emitter according to a process, such as that described in Macaulay et al., in which etched charged-particle tracks are utilized in forming electron-emissive elements, providing a polycarbonate film with uniform thickness and uniform physical properties means that the etching of the charged-particle tracks will be isotropic. This results in more uniform and reproducible geometry for the etched tracks over the surface of the film.

BRIEF DESCRIPTION OF THE DRAWINGS

FIG. 1a presents data at 20° C. for pure solutions of two polycarbonates of different molecular weight dissolved in dry pyridine. FIG. 1b presents data at 20° C. for pure solutions of one polycarbonate dissolved in two different solvents.

Like reference numbers are employed in the drawings and in the description of the preferred embodiments to represent the same, or very similar, item or items.

DESCRIPTION OF THE PREFERRED EMBODIMENTS

General Considerations

Figure 1A:
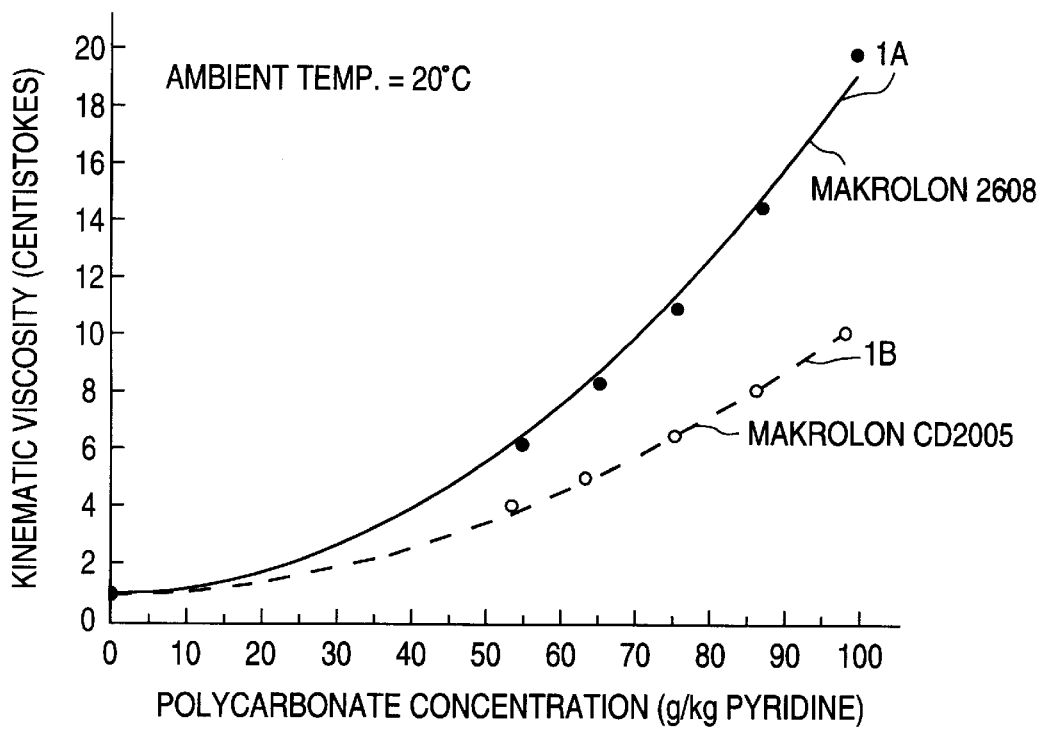
FIGS. 1a and 1b are graphs which illustrate kinematic viscosity of polycarbonate-containing solutions as a function of polycarbonate concentration.

A liquid chemical formulation consisting of polycarbonate material, a liquid that dissolves the polycarbonate material and one or more other constituents that may be liquid or solid in standard form (i.e., at standard temperature and pressure) is provided in accordance with the invention for making thin solid polycarbonate films of highly uniform thickness. The liquid used for dissolving the polycarbonate in the present liquid chemical formulation is often termed the "polycarbonate solvent" herein. When formed according to the invention using appropriate polycarbonate solvent, the polycarbonate-containing liquid chemical formulation yields a solid polycarbonate film whose thickness is substantially constant, ranging in value from 0.1 to 2 $\mu$m. In comparing film thicknesses at any two points separated by up to 10 cm on a planar substructure, the total percentage deviation in thickness from a perfectly uniform film is less than 10%, i.e., less than ±5% from the average thickness.

The polycarbonate films are typically employed in fabricating electron-emitting devices for flat-panel cathode-ray tube displays, but can be utilized in other applications such as physical filters, optical coatings or devices, and protective coatings. The composition and density of the polycarbonate films, typically transparent, are normally as uniform as the film thickness. Consequently, the optical properties of transparent polycarbonate films also meet similar uniformity criteria. For optically transparent polycarbonate films, optical quantities defined by the complex refractive index are uniform within similar tolerances.

The manufacture of a thin polycarbonate film according to the invention normally entails forming a liquid film of the present liquid chemical formulation over a substructure and removing the polycarbonate solvent and any other volatile components from the polycarbonate-containing liquid film. The non-volatile components of the original liquid formulation and any non-volatile reaction products of the original liquid formulation components then form the solid polycarbonate film.

Film Criteria and Constituents

Various process-related factors are important in meeting the thickness and uniformity criteria prescribed above for the polycarbonate film. To achieve the requisite thickness uniformity, the polycarbonate-containing liquid film is formed on the substructure using a method, typically spin coating, which enables the liquid film to have approximately the same uniformity as that of the final solid polycarbonate film. Spin coating can be controlled with sufficient precision for this purpose, being dependent primarily upon the solution viscosity, the angular velocity and angular acceleration of the substructure, and the length of time the substructure is spun.

When the liquid film is formed by spin coating, the kinematic viscosity of the polycarbonate-containing liquid chemical formulation of the invention is no more than 100 centistokes at a temperature of 20° C. and a pressure of 1 atmosphere, where 1 centistoke equals 1×10⁻⁶ m²/s and 1 atmosphere equals 101,325 Pa. Normally, the kinematic viscosity of the liquid formulation at 20° C. and 1 atmosphere is in the range of 2 to 25 centistokes for spin coating applications. When spin coating is used to create the liquid film, the rotation speed can be varied usefully from as little as 100 revolutions per minute ("rpm") to as much as 8,000 rpm. For a preferred rotation speed in the range of 1,000 to 3,000 rpm, the preferred kinematic viscosity of the liquid formulation lies in the range 8 to 12 centistokes at 20° C. and 1 atmosphere.

To attain good quality polycarbonate films, the percentage of water in the liquid chemical formulation should be quite low. In particular, the liquid formulation should have no more than 1% water by mass of the liquid formulation, preferably no more than 0.1% The mass percentage of water in the liquid formulation is typically on the order of 0.01% or less. A high concentration of water in the liquid formulation causes precipitation of the polycarbonate material, which can lead to the formation of poor-quality polycarbonate films. A high water concentration also causes generally undesired hydrolysis of the polycarbonate. Hydrolysis results in a change in the mean molecular weight of the polycarbonate dissolved in the liquid formulation.

The liquid chemical formulation of the invention has the following broad properties:

1a. Aside from the polycarbonate solvent (i.e., the liquid employed to dissolve the polycarbonate), the principal constituent of the liquid formulation is polycarbonate having a molecular weight of at least 10,000. The molecular weight of the polycarbonate is usually at least 20,000 and is normally no more than 100,000. Preferably, the molecular weight of the polycarbonate is 30,000 to 35,000.

The higher the molecular weight of the polycarbonate, the higher the kinematic viscosity of the liquid chemical formulation for a given concentration of polycarbonate. This relationship is illustrated in FIG. 1a in which the kinematic viscosity for experimental polycarbonate-containing solutions is plotted as a function of the mass concentration of polycarbonate in the solution for polycarbonates of two different molecular weights.

In particular, FIG. 1a presents data obtained at 20° C. for pure solutions of: (1A) MAKROLON® 2608 polycarbonate (specifically MAKROLON 2608-1000N polycarbonate) having a molecular weight of approximately 33,000 and (1B) MAKROLON CD2005 polycarbonate having a molecular weight of approximately 18,000. Both polycarbonate polymers, made by Bayer, were dissolved in dry pyridine, i.e., pyridine processed to reduce the water content to a very low level, typically no more than 0.01% by mass. FIG. 1a also illustrates, as expected, that the kinematic viscosity increases non-linearly with increasing polycarbonate concentration in pyridine.

Figure 1B:
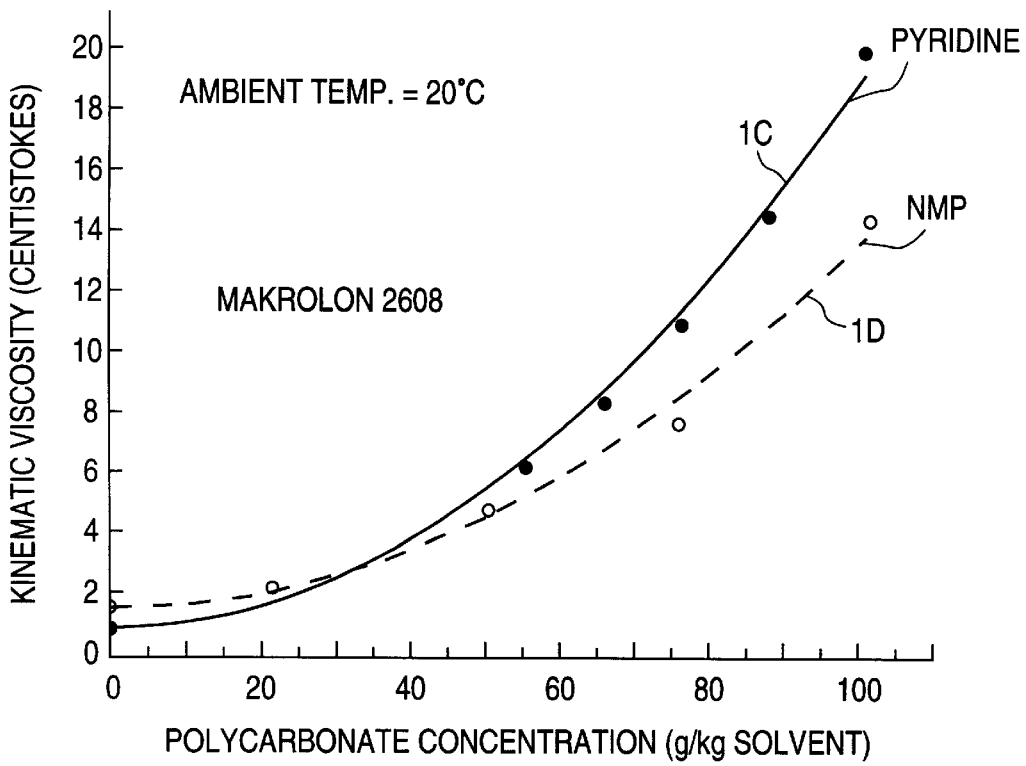

Similar variations of kinematic viscosity with polycarbonate concentration occur with other polycarbonate solvents. This is illustrated in FIG. 1b by way of kinematic viscosity/polycarbonate mass concentration data obtained at 20° C. for pure solutions of MAKROLON 2608 polycarbonate dissolved in: (1C) pyridine and (1D) 1-methylpyrrolidinone commonly known as NMP. As with the solutions represented by the data in FIG. 1a, the solvents used in generating the data in FIG. 1b were processed to reduce the water content to a very low level.

The data in FIGS. 1a and 1b are described well by a simple, approximate, semi-empirical model of polymer salvation in a "good" solvent, i.e., a solvent in which solute-solvent interactions are strong enough to partly uncoil the polymer chains in solution and permit relatively-free motion of the chains. The curves in FIGS. 1a and 1b were fitted to the data by least-squares regression and are described by the following variation of the Einstein equation:

$$v = v_o + ac^2 \qquad (1)$$

where $v$ is the kinematic viscosity of the solution, $v_o$ is the kinematic viscosity of the pure solvent, a is a constant which depends upon the chemical composition of the polycarbonate, upon its molecular weight and upon the identity of the solvent, and c is the concentration of polycarbonate. As FIGS. 1a and 1b make clear, the preferred ranges of polycarbonate concentration and kinematic viscosity can be achieved by preparing chemical solutions which contain polycarbonates within the specified range of molecular weight.

1b. The glass transition temperature $T_g$ of the polycarbonate is normally at least 65° C. In the process of removing the polycarbonate solvent and other volatile components from the liquid film created from the polycarbonate-containing liquid chemical formulation of the invention, the resulting polycarbonate film would be formed in an undesirable rubbery or molten state if the film temperature were more than approximately 15° C. above the polycarbonate glass transition temperature $T_g$ at the end of the polycarbonate solvent removal process. Unacceptable variations in film thickness would occur as the rubbery-to-molten polycarbonate film is cooled down to form a solid hard film.

In light of this, the 65° C. minimum $T_g$ value for the polycarbonate is derived from the specifications, described further below, that the boiling point $T_b(1\ \text{atm})$ of the polycarbonate solvent at 1 atmosphere be at least 80° C. to avoid having the polycarbonate solvent evaporate too quickly at an ambient temperature $T_{amb}$ in the vicinity of 20° C. and that the intermediate liquid film be capable of being dried under 1-atmosphere conditions at a temperature as low as the 1-atmosphere boiling point $T_b(1\ \text{atm})$ of the polycarbonate solvent in order to achieve a drying time short enough to be commercially acceptable while simultaneously avoiding undesirable thickness variations in the solid polycarbonate film due, for example, to a need for excessively high temperature at the end of the drying procedure.

The glass transition temperature $T_g$ of the polycarbonate is typically in the range of 120–170° C. $T_g$ for MAKROLON 2608 polycarbonate is 145±2° C.

1c. The polycarbonate material is substantially water-free (anhydrous) immediately prior to being dissolved in the polycarbonate solvent during the preparation of the liquid chemical formulation. In particular, the polycarbonate contains no more than 0.1% water by mass, preferably less than 0.01%. If the polycarbonate initially contains a higher mass percentage of water, the polycarbonate is suitably dried to reduce the water content below this value. The higher the water content of the polycarbonate, the higher the water content of the liquid formulation prepared from it.

1d. The liquid chemical formulation may include a surfactant, i.e., a soap-like material which exhibits a positive surface-excess concentration in the liquid formulation of the invention. The surfactant decreases the contact angle between the liquid formulation and the substructure, thereby improving the wetting of the substructure by the liquid formulation. The surfactant may be in liquid or solid form prior to being introduced into the polycarbonate solvent. If the surfactant is non-volatile, it will remain as a minor component of the solid polycarbonate film after the liquid film is processed to remove volatile components. The surfactant may or may not exhibit a positive surface-excess concentration in the solid polycarbonate film.

1e. The liquid chemical formulation may include an adhesive or adhesion promoter, i.e., a material which increases the energy per unit area necessary to separate the polycarbonate film from the substructure. As with the surfactant, the adhesive or adhesion promoter may be in liquid or solid form prior to being introduced into the polycarbonate solvent. If the adhesive or adhesion promoter is non-volatile, it likewise remains as a minor component of the solid polycarbonate film after the liquid film is processed to remove volatile components. The adhesive or adhesion promoter may also react with the substructure and/or the polycarbonate film at the substructure/film interface, leaving non-volatile products which form part of the polycarbonate film.

1f. The liquid chemical formulation may include a dye that dissolves in the polycarbonate solvent. The soluble dye may likewise remain as part of the solid polycarbonate film after processing the liquid film to remove volatile components.

The polycarbonate in the liquid chemical formulation of the invention can be chemically represented by the polymer formula:

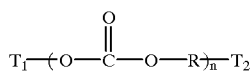
(2)

where O represents an oxygen atom, C represents a carbon atom, R represents a bivalent group, each connecting line represents a single covalent chemical bond, and plural integer n is the number of repetitions of the monomeric repeating unit, represented as the segment within the parentheses in formula 2. Standard polycarbonate terminating groups $T_1$ and $T_2$ are present at both ends of the polymer chain. The "core" of the polymer molecule is the segment of n monomeric repeating groups falling between terminating groups $T_1$ and $T_2$.

Each of terminating groups $T_1$ and $T_2$ is typically a methoxy ($CH_3O$), ethoxy ($C_2H_5O$), T-butyl ($C_4H_9O$) group, or an acetyloxy ("AcO") group where the termination link is made through the oxygen atom. $T_1$ and $T_2$ can also be ester groups that, for example, include aliphatic alcohols. Repetition integer n is normally at least 10, typically at least 100. The molecular weight of the polycarbonate increases linearly with increasing n.

In formula 2, bivalent group R is typically configured as:

$$-\phi_A-X-\phi_B-\qquad(3)$$

where each of $\phi_A$ and $\phi_B$ represents a phenylene group or a ring-substituted phenylene group, and X is typically an alkylene group but can be an ether group, a sulfide group or a sulfone group. For the specific case in which X is an alkylene group, formula 3 for bivalent group R can be modified to give R as:

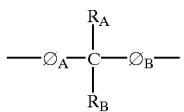
(4)

where each of $R_A$ and $R_B$ represents a hydrogen or deuterium atom, or a monovalent hydrocarbon group. When at least one of $R_A$ and $R_B$ is an alkylene group, the number of carbon atoms in the alkylene group typically varies from one to four.

A preferred form of the polycarbonate is poly(bisphenol A carbonate), in which $\phi_A$ and $\phi_B$ are both unsubstituted 1,4-phenylene groups and $R_A$ and $R_B$ are both methyl groups. In this case, the polymeric core of the polycarbonate is:

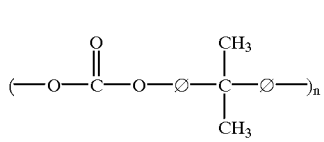
(5)

where H represents a hydrogen atom, $CH_3$ represents a methyl group, and $\phi$ represents an unsubstituted 1,4-phenylene group.

The preferred polycarbonate in formula 5 is usually a MAKROLON polycarbonate made by Bayer. Preferably, the MAKROLON polycarbonate is MAKROLON 2608, whose molecular weight is approximately 33,000. For MAKROLON 2608, the number n of repeating units is approximately 125.

A surfactant is present in the preferred formulation of the present liquid chemical formulation for the reasons outlined previously. The preferred surfactant is Fluorad™ FC-430 surfactant, a viscous liquid mixture of fluoroaliphatic polymeric esters made by Minnesota Manufacturing and Mining Co. and present at a concentration sufficient to act as a wetting agent. The concentration of Fluorad FC-430 surfactant in the liquid chemical formulation is 0.001–1 g surfactant/kg polycarbonate solvent, typically 0.22 g surfactant/kg polycarbonate solvent.

Polycarbonate Solvent Criteria and Constituents

The polycarbonate solvent is capable of dissolving sufficient polycarbonate to achieve a final polycarbonate film thickness between 0.1 and 2 μm, and a final thickness uniformity better than 10% (±5%), preferably better than 5% (±2.5%), for thicknesses measured at points on a planar substructure separated by up to 10 cm. For this purpose, the solubility of polycarbonate in the solvent is normally at least 1% by mass of the liquid chemical formulation at 20° C. and 1 atmosphere, but may be as low as 0.5% The solvent is preferably capable of dissolving at least 5% polycarbonate by mass at 20° C. and 1 atmosphere.

The liquid chemical formulation solution normally contains no more than 50% polycarbonate by mass of the liquid formulation when spin coating is used to make polycarbonate films. Liquid formulations with high polycarbonate concentration, e.g., greater than 50% by mass, can exhibit viscous fingering and slow surface wetting during spin coating, thereby yielding polycarbonate films of poorer uniformity in their physical properties. The percentage of polycarbonate in liquid formulations used for spin coating is typically no more than 20% by mass. The polycarbonate concentration ranges of 1% to 10% by mass, preferably 5% to 10% by mass, are especially useful for the formation of polycarbonate films of final thickness between 0.1 and 2 μm by spin coating.

In addition to the solubility requirements outlined above, the polycarbonate solvent has the following properties:

2a. The melting point $T_m(1\text{ atm})$ of the solvent at 1 atmosphere is less than 20° C. Typically, the ambient temperature $T_{amb}$ at which the liquid chemical formulation is coated onto the substructure in the process of making the polycarbonate film is approximately 20° C. Consequently, the condition that $T_m(1\text{ atm})$ be less than $T_{amb}$ ensures that the liquid chemical formulation of the invention is indeed a liquid at the conditions specified.

2b. The boiling point $T_b(1\text{ atm})$ of the polycarbonate solvent at 1 atmosphere is at least 80° C. As a result, $T_b(1\text{ atm})$ of the solvent is normally greater than or equal to $(T_{amb}+60°\text{ C.})$. This ensures that the rate of evaporation of the polycarbonate solvent from the liquid chemical formulation is sufficiently low at the ambient temperature $T_{amb}$ to permit the formation of a uniform liquid film of the formulation over the substructure in the process of making the polycarbonate film.

2c. The boiling point $T_b(0.001\text{ atm})$ of the polycarbonate solvent at 0.001 atmosphere is less than or equal to $(T_g+15°\text{ C.})$, where $T_g$ is the glass transition temperature of the polycarbonate, and 0.001 atmosphere is the lowest pressure to which the polycarbonate-containing liquid film is typically subjected by the manufacturing equipment employed in processing the liquid film to form a solid polycarbonate film according to the invention.

The viscosity of a polycarbonate film decreases precipitously as the film temperature increases from approximately 15° C. above the polycarbonate glass transition temperature $T_g$ to increasingly higher values, causing the film to go from a hard state (at no more than approximately 15° C. above $T_g$) to a rubbery state (at slightly more than 15° C. above $T_g$) and then to a molten state (at considerably more than 15° C. above $T_g$). At such elevated temperature, the polycarbonate film flows under the influence of gravity, the geometry of the structure underlying the film, and the composition of the underlying substructure. Film thickness variations which are unacceptably high for many commercial applications are produced in the flowing film and remain in the film after it is cooled down to a hardened state.

Setting $T_b(0.001\text{ atm})$ at no more than $(T_g+15°\text{ C.})$ enables the liquid film to be dried under 0.001-atmosphere conditions at a temperature as high as $T_b(0.001\text{ atm})$ without significantly changing the thickness uniformity of the polycarbonate film during the drying procedure. Hence, the polycarbonate solvent can be evaporatively removed from the uniform liquid film at the condition of highest temperature and lowest pressure typically encountered in processing of the liquid film to form the solid polycarbonate film.

Figure 2:
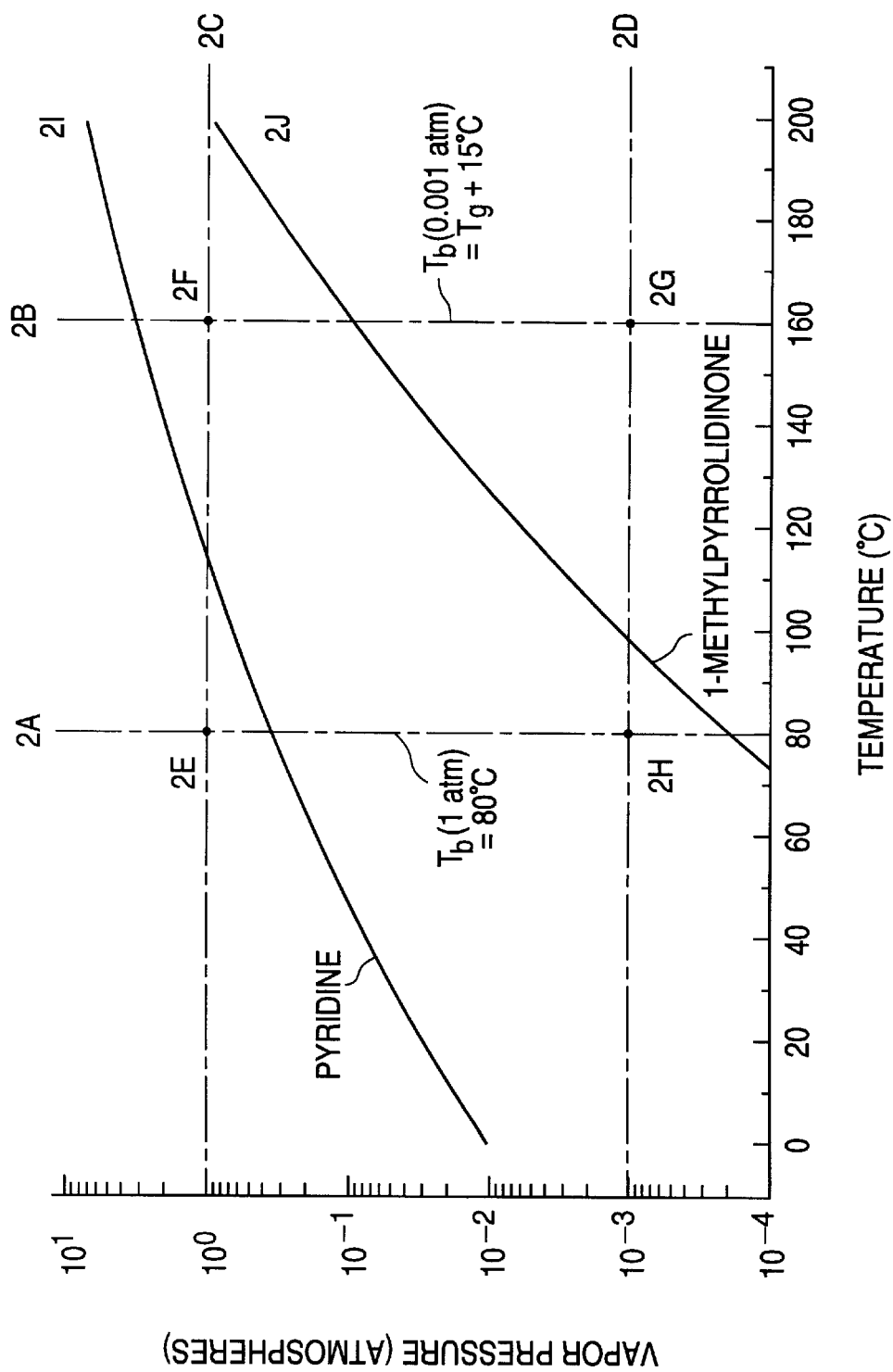
FIG. 2 is a graph of vapor pressure, plotted logarithmically as a function of temperature, for two different polycarbonate solvents which conform to the criteria outlined below and which are suitable for forming a polycarbonate-containing liquid chemical formulation in accordance with the invention.

FIG. 2 summarizes conditions 2b and 2c graphically by plotting the vapor pressure of pure polycarbonate solvent logarithmically as a function of temperature. Specifically, condition 2b relates to point 2E, and condition 2c relates to point 2G. Line 2A at 80° C. is the low-temperature limit for the boiling point $T_b(1\text{ atm})$ of the solvent at 1 atmosphere given in condition b. Line 2B at 160° C. is the high-temperature limit for the boiling point $T_b(0.001\text{ atm})$ of the solvent at 0.001 atmosphere, given in condition 2c, for the specific case of MAKROLON 2608 polycarbonate whose glass transition temperature $T_g$ is approximately 145° C. Line 2C denotes 1 atmosphere, the typical ambient pressure at which the solution of the invention is coated onto a substructure. Line 2D denotes 0.001 atmosphere, the lowest pressure typically encountered during the processing of the liquid film to form the solid polycarbonate film of the invention.

Line 2I is a plot of the vapor pressure curve for pure pyridine, and line 2J is a plot of the vapor pressure curve for pure 1-methylpyrrolidinone (NMP). With reference to FIG. 2, conditions 2b and 2c are satisfied by solvents whose vapor pressure curves cross the rectangular area {2E 2F 2G 2H}. Curves 2I and 2J satisfy this criterion. Both pyridine and 1-methylpyrrolidinone thus are suitable polycarbonate solvents for use in forming the liquid chemical formulation of the invention, as discussed further below, for this criterion.

2d. The polycarbonate solvent does not polymerize or chemically react with the polycarbonate material at a significant rate.

2e. The polycarbonate solvent is substantially water-free. Preferably, the solvent contains no more than 0.1% water by mass. If the solvent initially contains a higher percentage of water, the solvent is suitably dried to reduce the percentage of water to an appropriately low level.

2f. The polycarbonate solvent does not significantly promote or catalyze chemical reactions between the polycarbonate and other constituents of the liquid chemical formulation, such as water.

2g. The polycarbonate solvent does not react with water in the liquid chemical formulation to form significant concentrations of hydroxide ion, $OH^-$. In other words, the solvent is a relatively weak Bronsted base compared to hydroxide ion. When present in the liquid formulation of the invention, hydroxide ion reacts with the polycarbonate, resulting in scission of the polymer molecule and a decrease in the mean molecular weight of the polycarbonate.

Reaction of a solvent with water to form hydroxide ion is a conventional Bronsted acid-base reaction:

$$B+H_2O \rightleftharpoons BH^+ + OH^- \quad (6)$$

where B represents the solvent acting as a Bronsted base. If the solvent is a relatively weak Bronsted base compared to hydroxide ion, the solvent is also a weak Bronsted base in aqueous solution. Equivalently stated, the protonated form of the solvent molecule $BH^+$ is a weak Bronsted acid in aqueous solution.

The preferred upper limit for the concentration of hydroxide ion in the polycarbonate-containing liquid chemical formulation of the invention is approximately $10^{-3}$ mol/dm³, i.e., 1 mM. Given the limits described previously for water concentration in the liquid formulation, it follows that the protonated form of the solvent should have an acid dissociation constant $K_a(BH^+)$ in aqueous solution greater than $10^{-8}$ at 20° C. $K_a(BH^+)$ is the thermodynamic equilibrium constant for the reaction:

$$BH^+ + H_2O \rightleftharpoons H_2O^+ + B \quad (7)$$

The higher the concentration of hydroxide ion in the chemical liquid formulation of the invention, the shorter will be the effective shelf life of the liquid formulation.

2h. The polycarbonate solvent does not substantially chemically or physically alter the substructure onto which the liquid chemical formulation is coated.

2i. The polycarbonate solvent is non-pyrophoric, i.e., it does not ignite spontaneously upon exposure to air. The solvent should not oxidize to a significant extent when exposed to air.

2j. The polycarbonate solvent may itself include a surfactant component to improve the wetting characteristics of the liquid chemical formulation on the substructure. The surfactant component of the solvent should conform to the reactivity and composition conditions 2d to 2i given above.

The polycarbonate solvent typically consists primarily of pyridine, a liquid which meets the polycarbonate solubility requirements given above. Pyridine can dissolve considerably more than 10% polycarbonate by mass at 20° C. and 1 atmosphere. For example, the solubility of a MAKROLON polycarbonate such as MAKROLON 2608 can exceed 40% by mass in pyridine at 20° C. and 1 atmosphere.

The melting point $T_m$(1 atm) of pyridine at 1 atmosphere is approximately −42° C. This is less than 20° C., thereby enabling pyridine to meet condition 2a above. The boiling point $T_b$(1 atm) of pyridine at 1 atmosphere is approximately 115° C., which is greater than 80° C., as specified in condition 2b above. The boiling point $T_b$(0.001 atm) of pyridine at 0.001 atmosphere is approximately 5° C. This is less than the 160° C. value of ($T_g$+15° C.) for MAKROLON 2608 polycarbonate, thereby satisfying condition 2c above for MAKROLON 2608.

Pyridine is a nucleophile and thus can react with electrophilic moieties in polycarbonate to catalyze polycarbonate hydrolysis. However, the rates of these reactions are insignificant, and the extent of reaction is insignificant over time scales of months at the typical ambient temperature of 20° C., provided the water content of the liquid chemical formulation is sufficiently low. Storing the liquid chemical formulation of the invention at temperatures lower than 20° C. increases the shelf life of the liquid formulation.

Pyridine can be dried by standard methods to water concentrations less than 0.001% by mass. Although hygroscopic, pyridine is typically treated and handled in such a manner in the invention for the percentage of water in the composition solution to be less than 0.01% by mass.

The acid dissociation constant $K_a$ of protonated pyridine (the pyridinium ion) in aqueous solution at 20° C. is approximately $6\times10^{-6}$. Hence, pyridinium satisfies condition 2g that the acid dissociation constant of the protonated form of the polycarbonate solvent in aqueous solution be greater than $10^{-8}$ at 20° C.

Pyridine is not pyrophoric. It can be oxidized to form pyridine N-oxide. However, this reaction requires strong oxidizing agents, and the rates of air oxidation are insignificant at the typical ambient temperature of 20° C.

Pyridine is surface-active on many metals, semiconductors and insulators, typically acting as a corrosion inhibitor. Consequently, pyridine does not significantly alter the physical or chemical composition of many practical substructure materials.

The polycarbonate solvent may alternatively or additionally (i.e., in addition to what has previously been identified here for dissolving polycarbonate according to the invention's teachings) be formed with one or more ring-substituted pyridine derivatives (hereafter, for simplicity, generally referred to in the singular as a ring-substituted pyridine derivative). When a ring-substituted pyridine derivative is employed, the solvent likewise meets all the polycarbonate solvent criteria given above. Either pyridine or the ring-substituted pyridine derivative may be the primary constituent of the solvent when both constituents are present in the solvent.

Both pyridine and the ring-substituted pyridine derivative can be chemically represented as:

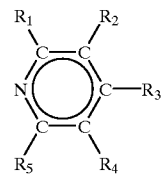

(8)

where N represents a nitrogen atom, and each of $R_1$, $R_2$, $R_3$, $R_4$ and $R_5$ represents a monovalent substituent bonded covalently to the aromatic ring. Each of $R_1$ to $R_5$ is typically a hydrogen atom, a deuterium atom, a monovalent hydrocarbon group, a monovalent substituted hydrocarbon group, an acetyl group, a carboxaldehyde group, a halogen atom, or a monovalent pseudo-halogen substituent. A substituted hydrocarbon group is a hydrocarbon group in which at least one of the hydrogen (or deuterium) atoms is replaced with another chemical species. For the monovalent hydrocarbon group, the number of carbon atoms for each of $R_1$ through $R_5$ normally ranges from one to four. The same range applies to the substituted monovalent hydrocarbon group.

Formula 8 yields pyridine when each of $R_1$ through $R_5$ is hydrogen or deuterium. The empirical formula for pyridine is $C_5H_5N$ in the fully hydrogen-substituted molecule. A ring-substituted pyridine derivative is produced when at least one of $R_1$ through $R_5$ in formula 8 is a substituent other than hydrogen or deuterium, preferably one from the above list.

Several types of ring-substituted pyridine derivatives are of special interest for use as the solvent. One type is the case in which one of $R_1$ to $R_5$ is an alkyl group, preferably having from one carbon atom (the picolines) to four carbon atoms. The remainder of $R_1$ through $R_5$ may consist of any of the monovalent covalent substituents given above, including hydrogen and deuterium.

A second type of pyridine derivative of special interest consists of those derivatives in which two adjacent substituent positions are taken up by a fused ring, i.e., a ring substituent which shares a carbon-carbon-bonded (non-nitrogen) edge with the pyridine ring. Two benz-fused examples of this type of pyridine derivatives are given below:

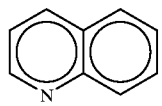

(9)

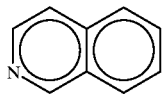

(10)

The intersection of two or more straight lines in a chemical formula such as formula 9 or 10 indicates the presence of a carbon atom.

In an aromatic fused-ring substituent, represented (for example) by the right hand ring in formula 9 or 10, each ring carbon outside the fused edge is covalently bonded to a monovalent substituent. In a non-aromatic fused-ring substituent, each ring carbon outside the fused edge is covalently bonded to a pair of monovalent substituents or to a bivalent substituent. Consequently, the ring substituent in a fused-ring substituent derivative of pyridine may itself be substituted. The remainder of the substituent positions may be taken up by one or more of the substituent groups listed above for $R_1$ through $R_5$ in formula 8. Examples of appropriate benz-fused derivatives of special interest are the substituted quinolines, formula 9, and the substituted isoquinolines, formula 10.

When at least one of $R_1$ through $R_5$ in formula 8 is a halogen atom, the halogen can be fluorine, chlorine, bromine or iodine, with fluorine or chlorine being preferred substituents. In the case of monovalent pseudo-halogen substituents, the substituent is typically a nitrile group.

Specifically, pyridine derivatives of interest for use as the polycarbonate solvent in the present liquid chemical formation include the liquids given in the following table:

TABLE 1

| Chemical Name | Empirical Formula | $T_b$ (1 atm) (° C.) |
|---|---|---|
| 2-methylpyridine | $C_6H_7N$ | 128 |
| 3-methylpyridine | $C_6H_7N$ | 144 |
| 4-methylpyridine | $C_6H_7N$ | 145 |
| 2-ethylpyridine | $C_7H_9N$ | 149 |
| 3-ethylpyridine | $C_7H_9N$ | 165 |
| 4-ethylpyridine | $C_7H_9N$ | 168 |
| 2,3-dimethylpyridine | $C_7H_9N$ | 163 |
| 2,4-dimethylpyridine | $C_7H_9N$ | 159 |
| 2,5-dimethylpyridine | $C_7H_9N$ | 157 |
| 2,6-dimethylpyridine | $C_7H_9N$ | 146 |
| 3,4-dimethylpyridine | $C_7H_9N$ | 163–164 |
| 3,5-dimethylpyridine | $C_7H_9N$ | 172 |
| 2-ethyl-4-methylpyridine | $C_8H_{11}N$ | 173 |
| 2-ethyl-6-methylpyridine | $C_8H_{11}N$ | 160 |
| 3-ethyl-4-methylpyridine | $C_8H_{11}N$ | 198 |
| 4-ethyl-2-methylpyridine | $C_8H_{11}N$ | 179 |
| 5-ethyl-2-methylpyridine | $C_8H_{11}N$ | 178 |
| 2-isopropylpyridine | $C_8H_{11}N$ | 160 |
| 4-isopropylpyridine | $C_8H_{11}N$ | 178 |
| 2-n-propylpyridine | $C_8H_{11}N$ | 166–168 |
| 4-n-propylpyridine | $C_8H_{11}N$ | 184–186 |
| 2-(t-butyl)pyridine | $C_9H_{13}N$ | 170 |
| 4-(t-butyl)pyridine | $C_9H_{13}N$ | 196 |
| 2-(1-ethylpropyl)pyridine | $C_{10}H_{15}N$ | 195 |
| 2-phenylpyridine | $C_{11}H_9N$ | 270 |
| 3-phenylpyridine | $C_{11}H_9N$ | 273 |
| 4-phenylpyridine | $C_{11}H_9N$ | 280 |
| 2-benzylpyridine | $C_{12}H_{11}N$ | 276 |
| 2-methoxypyridine | $C_6H_7NO$ | 142 |
| 4-methoxypyridine | $C_6H_7NO$ | 191 |
| 2-hydroxypyridine | $C_6H_7NO$ | 113 |
| 3-hydroxypyridine | $C_6H_7NO$ | 154 |
| 2-(2-hydroxyethyl)pyridine | $C_7H_9NO$ | 113 |
| 2-chloropyridine | $C_5H_4ClN$ | 170 |
| 3-chloropyridine | $C_5H_4ClN$ | 148 |
| 4-chloropyridine | $C_5H_4ClN$ | 147 |
| 2-chloro-6-methoxypyridine | $C_6H_6ClNO$ | 185–186 |
| 2-bromopyridine | $C_5H_4BrN$ | 193 |
| 3-bromopyridine | $C_5H_4BrN$ | 173 |
| 2-fluoropyridine | $C_5H_4FN$ | 126 |
| 3-fluoropyridine | $C_5H_4FN$ | 106 |
| 2-iodopyridine | $C_5H_4IN$ | >93 |

In addition to satisfying condition 2d that the boiling point $T_b$(1 atm) of the polycarbonate solvent at 1 atmosphere be at least 80° C. as indicated by the boiling point data given in Table 1, all of the preceding pyridine derivatives satisfy condition 2a that the melting point $T_m$(1 atm) of the solvent at 1 atmosphere be less than 20° C. For the case in which the polycarbonate is MAKROLON 2608 whose glass transition temperature $T_g$ is approximately 145° C., all of the pyridine derivations in Table 1 likewise meet condition 2c that the boiling point $T_b$(0001 atm) of the polycarbonate solvent at 0.001 atmosphere be no more than ($T_g$+15° C.). Furthermore, it appears that all of these pyridine derivatives satisfy condition 2g that the acid dissociation constant of the protonated form of the polycarbonate solvent in aqueous solution be greater than $10^{-8}$ at 20° C. and 1 atmosphere.

The polycarbonate solvent may alternatively or additionally be formed with pyrrole or/and one or more ring-substituted pyrrole derivatives (hereafter, for simplicity, generally referred to in the singular as a ring-substituted pyrrole derivative). When the solvent utilizes pyrrole or/and a ring-substituted pyrrole derivative, the solvent likewise meets all the polycarbonate solvent criteria given above. Either pyrrole or the ring-substituted pyrrole derivative may be the primary constituent of the solvent when both constituents are present in the solvent and any other polycarbonate-dissolving constituent candidate is present at a lower mass fraction.

Both pyrrole and the ring-substituted pyrrole derivative can be chemically represented as:

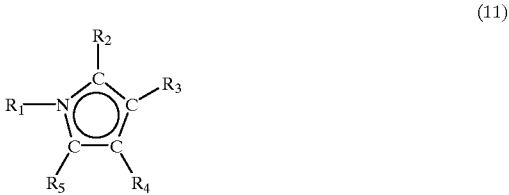

(11)

where N represents a nitrogen atom, and each of $R_1$, $R_2$, $R_3$, $R_4$ and $R_5$ represents a monovalent substituent bonded covalently to the ring. Each of $R_1$, to $R_5$ is typically a hydrogen atom, a deuterium atom, a monovalent hydrocarbon group, a monovalent substituted hydrocarbon group, an acetyl group, a carboxaldehyde group, a halogen atom, or a monovalent pseudo-halogen substituent. For the hydrocarbon group or the substituted hydrocarbon group, the number of carbon atoms for each of $R_1$ through $R_5$ normally ranges from one to four.

Formula 11 yields pyrrole when each of $R_1$ through $R_5$ is hydrogen or deuterium. The empirical formula for pyrrole is $C_4H_5N$ in the fully hydrogen-substituted molecule. A ring-substituted pyrrole derivative is produced when at least one of $R_1$ through $R_5$ is a substituent other than hydrogen or deuterium, preferably one from the above list.

Several types of ring-substituted pyrrole derivatives are of special interest for use as the polycarbonate solvent. One type is the case in which $R_1$ is an alkyl group, preferably having from one to four carbon atoms. The remainder of $R_2$ through $R_5$ may consist of any of the monovalent covalent substituents given above, including hydrogen and deuterium.

For example, one ring-substituted pyrrole derivative having $R_1$ as an alkyl group is 1-methylpyrrole (or N-methylpyrrole) for which the alkyl group is a methyl group (one carbon atom). The empirical formula for 1-methylpyrrole is $C_5H_7N$ in the fully hydrogen-substituted molecule. 1-methylpyrrole has a melting point $T_m$(1 atm) of approximately −57° C. at 1 atmosphere and a boiling point $T_b$(1 atm) of approximately 113° C. at 1 atmosphere. Consequently, conditions 2a and 2b are met with 1-methylpyrrole.

The boiling point of a liquid decreases with decreasing pressure. Since the boiling point $T_b$(1 atm) of 1-methylpyrrole at 1 atmosphere is approximately 113° C. and is therefore less than ($T_g$+15° C.) for MAKROLON 2608 polycarbonate whose glass transition $T_g$ is approximately 145° C., 1-methylpyrrole necessarily satisfies condition 2c when the polycarbonate is MAKROLON 2608. 1-methylpyrrole, a much weaker base than pyridine, satisfies solvent condition 2g and the polycarbonate solubility requirements given above.

A second type of pyrrole derivative of special interest consists of those derivatives in which two adjacent substituent positions are taken up by a fused ring, i.e., a ring substituent which shares an edge with the pyrrole ring. A benz-fused example of this type of pyrrole derivative is given below:

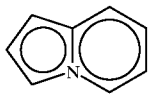

(12)

Substituents suitable for each ring carbon outside the fused edge in a fused-ring substituent derivative of pyrrole are the same as those described above for the fused-ring substituent derivatives of pyridine. Consequently, the substituent ring in a fused-ring substituent derivative of pyrrole may itself be substituted. The remainder of the substituent positions may be taken up by one or more of the substituent groups listed above for $R_1$ through $R_5$ in formula 11. Examples of appropriate benz-fused derivatives of special interest are the substituted indoles, formula 12.

When at least one of $R_1$ through $R_5$ in formula 11 is a halogen atom, the halogen can be fluorine, chlorine, bromine or iodine, with fluorine or chlorine being preferred substituents. In the case of pseudo-halogen substituents, the substituent is typically a nitrile group.

Aside from 1-methylpyrrole, other pyrrole derivatives of specific interest for use as the polycarbonate solvent in the liquid chemical formulation of the invention include the liquids given in the following table:

TABLE 2

| Chemical Name | Empirical Formula | $T_b$ (1 atm) (° C.) |
|---|---|---|
| 2-methylpyrrole | $C_5H_7N$ | 147 |
| 3-methylpyrrole | $C_5H_7N$ | 142 |
| 1-ethylpyrrole | $C_6H_9N$ | 129 |
| 2-ethylpyrrole | $C_6H_9N$ | 163 |
| 2,4-dimethylpyrrole | $C_6H_9N$ | 171 |
| 2,5-dimethylpyrrole | $C_6H_9N$ | 170 |
| 1-tert-butylpyrrole | $C_8H_{13}N$ | 153 |
| 2-isopropylpyrrole | $C_7H_{11}N$ | 171 |
| 1-propylpyrrole | $C_7H_{11}N$ | 145 |
| 1-butylpyrrole | $C_8H_{13}N$ | 170 |
| 2,3-dimethyl-4-ethylpyrrole | $C_8H_{13}N$ | 198 |
| 2,4-dimethyl-3-ethylpyrrole | $C_8H_{13}N$ | 197 |
| 3-ethyl-2,4,5-trimethylpyrrole | $C_9H_{15}N$ | 213 |
| 1-phenylpyrrole | $C_{10}H_9N$ | 234 |
| 1-benzylpyrrole | $C_{11}H_{11}N$ | 247 |
| 1-acetylpyrrole | $C_6H_7NO$ | 181 |
| 2-acetylpyrrole | $C_6H_7NO$ | 220 |

Besides satisfying condition 2b that the boiling point of the polycarbonate solvent at 1 atmosphere be at least 80° C. as indicated by the boiling point data given in Table 2, all of the foregoing pyrrole derivatives satisfy condition 2a that the melting point Tm(1 atm) of the solvent at 1 atmosphere be less than 20° C. For MAKROLON 2608 polycarbonate with glass transition temperature $T_g$ of approximately 145° C., all of the pyrrole derivatives in Table 2 meet condition 2c that the boiling point $T_b$(0.001 atm) of the polycarbonate solvent at 0.001 atmosphere be no greater than ($T_g$+15° C.). All of these pyrrole derivatives also appear to satisfy condition 2g that the protonated form of the polycarbonate have an acid dissociation constant greater than $10^{-8}$ at 20° C. and 1 atmosphere.

The polycarbonate solvent may alternatively or additionally be formed with pyrrolidine or/and one or more pyrrolidine derivatives (hereafter, for simplicity, generally referred to in the singular as a pyrrolidine derivative). When the solvent utilizes pyrrolidine or/and a pyrrolidine derivative, the solvent likewise meets all the polycarbonate solvent criteria given above.

Pyrrolidine and pyrrolidine derivatives can be chemically represented in general as:

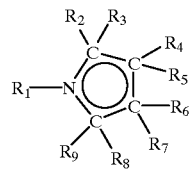

(13)

where N represents a nitrogen atom, and $R_1$ through $R_9$ represent covalently bonded substituents, with the maximum possible number of substituents being depicted in formula 13. In the parent compound pyrrolidine (probably of limited use here because of its excessive Bronsted basicity), $R_1$ through $R_9$ are hydrogen or deuterium atoms.

Substituents for $R_1$ through $R_9$ in formula 13 are typically chosen from hydrogen atoms, deuterium atoms, oxygen atoms, monovalent or bivalent hydrocarbon groups, monovalent or bivalent substituted hydrocarbon groups, acetyl groups, carboxaldehyde groups, halogen atoms, or monovalent pseudo-halogen substituents. For each hydrocarbon group or substituted hydrocarbon group, the number of carbon atoms for each of $R_1$ through $R_9$ normally ranges from one to four. Pyrrolidine derivatives which include one endocyclic double bond between ring atoms are also of interest.

Several pyrrolidine derivatives are of special interest for use as the polycarbonate solvent. For example, pyrrolidine derivatives of particular interest include those in which the ring nitrogen participates in, or is conjugated with, a multiple covalent bond, either endocyclicly or exocyclicly. Pyrrolidine derivatives having a covalent substituent ($R_1$) other than hydrogen or deuterium at the nitrogen position are also of particular interest. In pyrrolidine derivatives having a covalent substituent other than hydrogen or deuterium at the nitrogen position, the nitrogen atom may also be conjugated with a multiple covalent bond. All of these situations lead to a significant decrease in the basicity of the solvent compared to the parent compound, pyrrolidine.

Examples of such pyrrolidine derivatives having a double covalent bond are shown below:

(14)

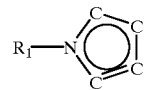

(15)

-continued (16)

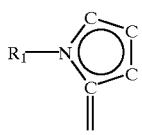

Aside from the limitations imposed by the double bond, substituents for $R_2$ through $R_9$ in formulas 14 through 16 can be chosen from any of those described above in connection with formula 13. Formula 14 illustrates the case in which the ring nitrogen participates in a double covalent bond. Formulas 15 and 16 illustrate the situations in which the ring nitrogen is conjugated respectively with an endocyclic double covalent bond and an exocyclic double covalent bond. For cases in which $R_1$ is not hydrogen or deuterium, formulas 15 and 16 constitute pyrrolidine derivatives in which a covalent substituent other than hydrogen or deuterium is at the nitrogen position.

For example, one pyrrolidine derivative chemically arranged according to formula 16 is 1-methylpyrrolidinone (or 1-methylpyrrolidone or N-methylpyrrolidone from which comes the common name NMP) whose empirical formula is $C_5H_9NO$. 1-methylpyrrolidinone has a methyl substituent ($R_1$) on the ring nitrogen, and one of the carbon atoms in the alpha position relative to the nitrogen atom is bonded to an oxygen atom via a conjugated exocyclic double bond as shown below:

(17)

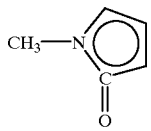

1-methylpyrrolidinone has a melting point $T_m(1\text{ atm})$ of approximately −24° C. at 1 atmosphere and a boiling point $T_b(1\text{ atm})$ of approximately 202° C. at 1 atmosphere. Conditions 2a and 2b are therefore satisfied with 1-methylpyrrolidinone. The boiling point of 1-methylpyrrolidinone at 0.018 atmosphere is approximately 84° C. Since boiling point decreases with decreasing pressure, the boiling point $T_b(0.001\text{ atm})$ of 1-methylpyrrolidinone at 0.001 atmosphere is less than 84° C. For dissolving a polycarbonate such as MAKROLON 2608 whose glass transition $T_g$ temperature is approximately 145° C., 1-methylpyrrolidinone satisfies condition 2c above that the boiling point $T_b(0.001\text{ atm})$ of the polycarbonate solvent at 0.001 atmosphere be no more than $(T_g+15°\text{ C.})$. 1-methylpyrrolidinone is a much weaker base than pyridine and satisfies the polycarbonate solubility requirements given above.

When at least one covalent substituent in formula 13 is a halogen atom, the halogen can be fluorine, chlorine, bromine or iodine, with fluorine or chlorine being preferred substituents. In the case of pseudo-halogen substituents, the substituent is typically a nitrile group.

Aside from 1-methylpyrrolidinone, other pyrrolidine derivatives of specific interest for use as the polycarbonate in the present liquid chemical formulation include the liquids given in the following table:

TABLE 3

| Chemical Name | Empirical Formula | $T_b$ (1 atm) (° C.) |
|---|---|---|
| 2-pyrrolidinone | $C_4H_7NO$ | 128 |
| 1-ethyl-2-pyrrolidinone (or N-ethylpyrrolidone) | $C_6H_{11}NO$ | 97 |
| 1-cyclohexylpyrrolidinone (or N-cyclohexylpyrrolidone) | $C_{10}H_{17}NO$ | 153 |

In addition to satisfying condition 2b that the boiling point of the polycarbonate solvent at 1 atmosphere be at least 80° C. as indicated by the boiling point data given in Table 3, all of the foregoing pyrrolidine derivatives satisfy condition 2a that the melting point $T_m(1\text{ atm})$ of the solvent at 1 atmosphere be less than 20° C. For MAKROLON 2608 polycarbonate with an approximate 145° C. $T_g$, all of the pyrrolidine derivatives in Table 3 meet condition 20 that the boiling point $Tb$ (0.001 atm) of the polycarbonate solvent at 0.001 atmosphere be no greater than $(T_g+15°\text{ C})$. It also appears that all of these pyrrolidine derivatives satisfy condition 2g that the protonated form of the polycarbonate have an acid dissociation constant greater than $10^{-8}$ at 20° C. and 1 atmosphere.

The polycarbonate solvent may alternatively or additionally be formed with either or both of chlorobenzene and cyclohexanone. The respective empirical formulas for these two liquids are $C_6H_5Cl$ and $C_6H_{10}O$. Chlorobenzene and cyclohexanone can be chemically represented respectively as:

(18)

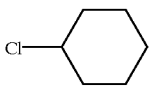

(19)

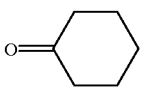

where the intersection of two or more lines again represents a carbon atom.

When the solvent utilizes chlorobenzene or cyclohexanone, the solvent meets all of the polycarbonate solvent criteria given above. Either of these liquids may be the primary constituent of the solvent when the other liquid is present in the solvent and any other polycarbonate-dissolving constituent candidate is present at a lower mass fraction.

Chlorobenzene, a monohalogenated benzene ring, is a weak (or soft) base. Chlorobenzene is largely insoluble in water. Nonetheless, the protonated form of chlorobenzene appears to have an acid dissociation constant greater than $10^{-8}$ in aqueous solution at 20° C. Accordingly, chlorobenzene satisfies condition 2g that the acid dissociation constant of the protonated form of the polycarbonate solvent in aqueous solution be greater than $10^{-8}$ at 20° C.

The 1-atmosphere melting point $T_m(1\text{ atm})$ of chlorobenzene is approximately −46° C. Chlorobenzene therefore meets condition 2a that the 1-atmosphere melting point $T_m(1\text{ atm})$ of the polycarbonate solvent be less than 20° C. The 1-atmosphere boiling point $T_b(1\text{ atm})$ of chlorobenzene is approximately 132° C. Consequently, chlorobenzene meets condition 2b that the 1-atmosphere boiling point $T_b(1\text{ atm})$ of the solvent be no more than 80° C. Chlorobenzene's boiling point at 0.013 atmosphere is approximately 22° C. Condition 2c specifies that the 0.001-atmosphere boiling point $T_b$(0.001 atm) of the solvent be no more than $(T_g+15°$ C.). Since boiling point decreases with decreasing pressure, chlorobenzene meets condition 2c for polycarbonates such as MAKROLON 2608 whose glass transition temperature $T_g$ is approximately 145° C.

Cyclohexanone is also a weak base. The acid dissociation constant of the protonated form of cyclohexanone in aqueous solution appears to be greater than $10^{-8}$ at 20° C. Hence, cyclohexanone appears to satisfy condition 2g.

The 1-atmosphere melting point $T_m$(1 atm) of cyclohexanone is approximately −16° C., enabling cyclohexanone to meet condition 2a. The 1-atmosphere boiling point $T_b$(1 atm) of cyclohexanone is approximately 156° C. so that cyclohexanone satisfies condition 2b. With a boiling point of 47° C. at 0.020 atmosphere, cyclohexanone also meets condition 2c for polycarbonates such as MAKROLON 2608.

Polycarbonate Film Preparation

Figure 3:
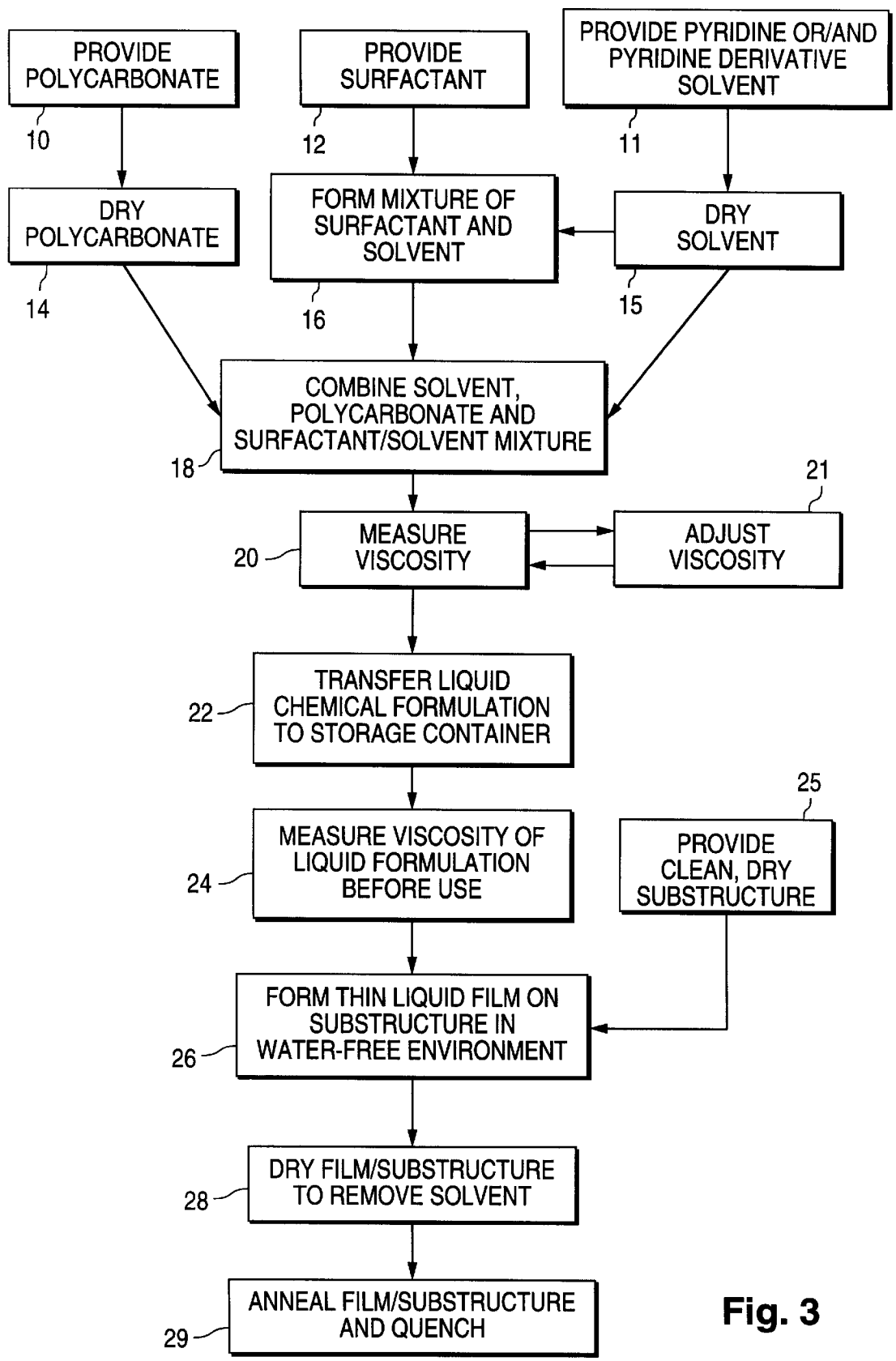
FIG. 3 is a flow chart of a process for producing a polycarbonate-containing liquid chemical formulation in accordance with the invention and then utilizing the liquid formulation so produced to make a solid polycarbonate film according to the invention.

FIG. 3 presents a flowchart of the primary steps involved in producing a polycarbonate-containing liquid chemical formulation in accordance with the invention and then using the liquid formulation to make a thin, solid polycarbonate film according to the invention's teachings. FIG. 3 illustrates the preferred case in which the polycarbonate solvent consists substantially of pyridine or/and a ring-substituted pyridine derivative.

The first steps in making the polycarbonate film are, as shown in blocks 10, 11 and 12 of FIG. 3, to provide: (a) polycarbonate material, (b) a polycarbonate solvent formed with pyridine or/and a ring-substituted pyridine derivative and (c) a surfactant. The solvent preferably consists of essentially 100% pyridine and is substantially water-free. The polycarbonate material normally consists of granulated MAKROLON polycarbonate, preferably MAKROLON 2608. The surfactant preferably is Fluorad FC-430 polymeric ester mixture.

If the polycarbonate material is not water-free, it is dried in a water-free environment, typically overnight in flowing dry nitrogen between 120° C. and 125° C., as indicated in block 14. The water content of the polycarbonate is thereby reduced to a value typically less than 0.01% by mass. If other solid materials are to be present in the liquid chemical formulation, they are dried similarly. Suitable methods for drying and handling water-sensitive and air-sensitive materials are described in Shriver et al., *The Manipulation of Air-Sensitive Compounds*(John Wiley & Sons), 1986. Also see "Handling air-sensitive reagents," Tech. Bull. AL-134, Aldrich Chemical Co., December 1994, 8 pp.

If the water content of the polycarbonate solvent is too great, the solvent is normally dried, block 15. Standard methods may be used. For example, the solvent may be treated with vacuum-dried molecular sieves followed by distillation under an inert, dry atmosphere.

A stock liquid mixture (substantially a solution) of the surfactant and the dried polycarbonate-solvent is prepared by combining a weighed portion of the surfactant with an aliquot of the dry solvent under an inert atmosphere, block 16.

The liquid chemical formulation is now formed by combining the substantially dry polycarbonate material, possibly one or more other dry solid materials, an aliquot of the stock surfactant/solvent mixture and the substantially dry polycarbonate solvent, all in a water-free environment, typically dry nitrogen. The mass percentage of polycarbonate is chosen to yield a solid polycarbonate film thickness in the range of 0.1 to 2 $\mu$m and with the thickness uniformity described previously. Block 18 in FIG. 3 illustrates this step, described further below.

In preparing the liquid chemical formulation, the dry polycarbonate solvent is transferred to a clean, dry, weighed container using Schlenck transfer methods, typically under dry nitrogen. The container is weighed to determine the mass of solvent. The aliquot of surfactant/solvent mixture is also transferred using Schlenck methods, and its mass is determined by a difference technique. Finally, the dry polycarbonate material is loaded into the container, again using Schlenck transfer techniques, and the mass of the polycarbonate is determined by a difference technique. Any other solids are added, and their masses are determined in a similar manner.

If magnetic stirring is to be used to mix the liquid formulation, an appropriate magnetic stirring bar is added at this time. Finally, the container is sealed under a slight positive pressure of inert dry gas, typically dry nitrogen. The constituents of the liquid formulation are mixed for a sufficient time to form a homogeneous liquid. Up to 3 days may be needed to dissolve all the dissolvable solid material at an ambient temperature $T_{amb}$ of 20° C. using slow magnetic stirring.

After all the polycarbonate and other dissolvable solid materials have been dissolved, the kinematic viscosity of the liquid chemical formulation is determined, as indicated in block 20. The kinematic viscosity of the solution may be adjusted, block 21, by adding more of the dry polycarbonate solvent to decrease viscosity, or by adding more dry polycarbonate to increase viscosity, or by changing the temperature of the liquid formulation, or by mixing two or more liquid chemical formulations of different kinematic viscosities made from the same polycarbonate material. All such operations are performed under inert-atmosphere conditions and are followed by thorough mixing of the resulting polycarbonate-containing liquid formulation.

After any necessary changes have been made to the kinematic viscosity of the liquid chemical formulation, the formulation is transferred to a dry container, typically under a slight positive pressure of dry, inert gas, typically dry nitrogen. Block 22 indicates this step. The container is sealed gas-tight and the formulation is stored, preferably at or below normal room temperature to minimize chemical degradation of the polycarbonate through hydrolysis or other reactions.

The fabrication of the polycarbonate film begins with the determination of the kinematic viscosity of the polycarbonate-containing liquid chemical formulation immediately prior to use, block 24. Significant changes in the kinematic viscosity of the liquid formulation during storage are indicative of chemical or physical degradation. Degradation of the formulation may affect the quality of polycarbonate films made with the formulation.

Measurements of kinematic viscosity can be performed in a number of ways. For example, a sample of the liquid chemical formulation may be removed and tested, a viscosity measurement device may be incorporated into the liquid formulation dispensing equipment, or viscosity may be measured indirectly by the preparation of witness samples of polycarbonate films whose thicknesses are compared to a calibration curve.

The polycarbonate film is formed on a clean, dry substructure. In the preferred method, block 25, the substructure is cleaned of surface dirt and particles, degreased by washing in appropriate non-aqueous organic solvents and dried at temperature greater than 100° C. in a flow of inert gas. If necessary, the surface can be oxidized, once cleaned, to improve wetting by the polar liquid chemical formulation of the invention. It is important that the liquid formulation wet the surface of the substructure at a contact angle significantly less than 90°, preferably approaching 0°.

Assuming that the kinematic viscosity of the liquid chemical formulation is acceptable, a portion of the liquid formulation is delivered to the surface of the substructure in a substantially water-free environment, typically dry nitrogen. The volume of formulation so delivered should be in excess of the volume of uniform liquid film prepared in the next step. The formulation should be delivered in a slow stream at the center of rotation of the substructure in such a way that gas bubbles are not formed or entrained in the delivered liquid formulation. Gas bubbles adhering to the surface of the substructure or floating on the surface of the delivered formulation lead to inhomogeneities in the thickness of the liquid film produced in the next step and thus are undesirable. The substructure may be stationary or slowly rotating during the dispensing of the formulation.

Figure 4:
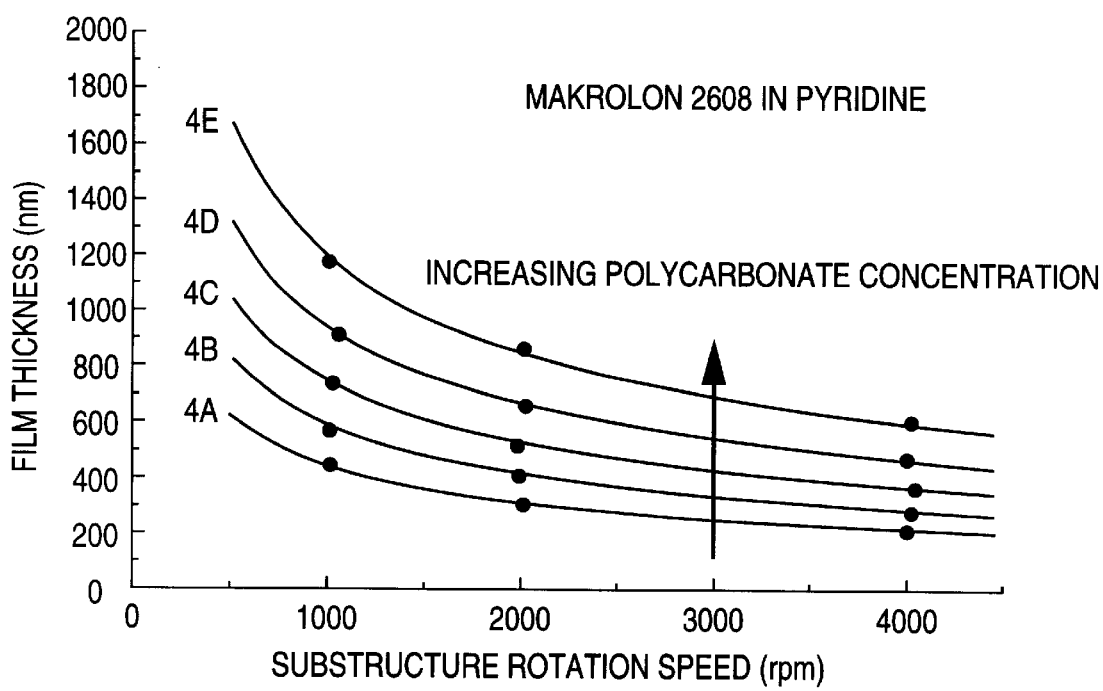
FIG. 4 is a graph which illustrates the dependence of solid polycarbonate film thickness on the rotational speed of the substructure for polycarbonate films formed by spin coating polycarbonate-containing liquid chemical formulations onto a planar substructure. Curves are shown for five solutions of different polycarbonate concentration but made from the same molecular weight polymer, and using the same polycarbonate-containing solvent.

While keeping the resulting structure in a substantially water-free environment, the substructure is spun on an axis normal to its surface to convert the portion of liquid chemical formulation on the substructure into a thin polycarbonate-containing liquid film. FIG. 4 illustrates the dependence of solid polycarbonate film thickness on the rotation speed of the substructure, for polycarbonate films formed by spin coating polycarbonate/pyridine solutions. Curves are shown for five polycarbonate solutions made from the same molecular weight polymer, MAKROLON 2608 polycarbonate, present at different concentrations in the same solvent, pyridine: (4A) 55 g polycarbonate/kg pyridine, (4B) 65 g/kg pyridine, (4C) 76 g/kg pyridine, (4D) 87 g/kg pyridine, and (4E) 100 g/kg pyridine.

The points in FIG. 4 are measured values and the curves are model curves fitted to the data points by least-squares regression. The model is an extended Prandtl Layer hydrodynamic model defined by the equation:

$$d=(mc+b)c(v/\omega)^{1/2} \qquad (20)$$

where d is the thickness of the solid polycarbonate film, c again is the concentration of polycarbonate, m and b are empirical constants dependent upon the type of polycarbonate, its molecular weight and the identity of the polycarbonate solvent, v again is the kinematic viscosity of the liquid chemical formulation, and $\omega$ is the rotation speed of the substructure. All the curves in FIG. 4 were generated from the same best-fit values of m and b. Equation 1 may be used to estimate the kinematic viscosity of the solution from the concentration of the polycarbonate, provided the empirical constant a is known.

The preferred rotation speed $\omega$ of the substructure is 1000 to 3000 rpm, typically 1100 to 1200 rpm, when the polycarbonate is MAKROLON 2608 at a concentration of approximately 75 g/kg polycarbonate solvent, and the polycarbonate solvent is pyridine. The angular acceleration rate $d\omega/dt$ is preferably high enough to prevent uneven spreading of the polycarbonate-containing liquid chemical formulation over the substructure due to "viscous fingering" of the liquid formulation, yet low enough to permit adequate wetting of the substructure as the perimeter of the dispensed formulation spreads over the surface of the substructure. The preferred value of angular acceleration $d\omega/dt$ is 10 rpm/s when the polycarbonate is MAKROLON 2608, the polycarbonate solvent is pyridine, and the polycarbonate concentration is approximately 75 g polycarbonate/kg pyridine. The delivery of liquid formulation and the spin coating operations are preferably done in a continuous sequence. Block 26 in FIG. 3 summarizes the operations by which spin coating is used to form the polycarbonate-containing liquid film.

The liquid film and the underlying substructure are dried to remove the polycarbonate solvent and any other volatile components of the film as indicated in block 28 of FIG. 3. The drying operation can be performed at room temperature or at an elevated temperature and/or reduced pressure, typically as low as 0.001 atmosphere, to reduce the drying time. Typically, the structure is placed on a dry-air-vented hotplate at 125° C. for 30 s after MAKROLON 2608 has been spin-coated from the pyridine-based liquid formulation onto a substructure. Since the glass transition temperature $T_g$ of MAKROLON 2608 is approximately 145° C., the drying temperature is below the glass transition point for MAKROLON 2608. Accordingly, the polycarbonate film is produced as a microcrystalline solid, i.e., in a glassy state.

For elevated-temperature film drying, the drying temperature is controlled so as to avoid exceeding the glass transition temperature $T_g$ of the polycarbonate by more than approximately 15° C. This prevents the resultant polycarbonate film (a) from being produced in an undesirable rubbery state, a condition that would arise if the drying temperature at the end of the drying operation were to reach a value slightly more than approximately 15° C. above the polycarbonate $T_g$ or (b) from being produced in an undesirable molten state, a condition that would occur if the drying temperature to the end of the drying operation were to reach a value considerably greater than 15° C. above the polycarbonate $T_g$.

The rate at which the volatile components evaporate from the polycarbonate-containing liquid film increases as the drying pressure decreases. If reduced pressure is employed during the drying procedure to reduce the drying time, the polycarbonate-containing liquid film is placed in a vacuum chamber attached to a suitable vacuum pumping system. The lowest chamber pressure to which the liquid film is subjected by the vacuum system during the drying operation is, as indicated above, typically in the vicinity of 0.001 atmosphere.

For drying at 0.001 atmosphere, it is necessary to satisfy the condition that the vapor pressure of the polycarbonate solvent be at least equal to, normally greater than, 0.001 atmosphere at the drying temperature to ensure that substantially all of the solvent is removed from the liquid film. To avoid producing the polycarbonate film in a rubbery or molten state, the drying temperature at the end of the drying operation must not be greater than approximately 15° C. above the glass transition temperature $T_g$ of the polycarbonate material. The result of these two conditions is that the boiling point $T_b(0.001\ atm)$ of the polycarbonate solvent at 0.001 atmosphere should be no more than approximately 15° C. above the polycarbonate glass transition temperature $T_g$.

The polycarbonate material remaining after the drying step is in the form of a uniform, thin, normally microcrystalline solid film. The solid film may also contain other non-volatile solid materials or reaction products as minor components, as described previously. Except when the present liquid chemical formulation has been provided with an additive (e.g., a black dye) to make the solid film opaque, the solid film is normally transparent. Typically, the thickness and thickness uniformity of the solid polycarbonate film are now tested to determine whether those parameters fall within the desired range of values. In some applications, the drying and testing operations complete the polycarbonate film manufacturing process. If a high degree of uniformity is needed in polycarbonate density, further processing of the film is performed as described below.

In other applications, the polycarbonate film is annealed at a temperature $T_{ann}$ sufficiently high to transform the polycarbonate from a glass-like solid having some short-range molecular ordering into a viscous, amorphous, leathery or retarded-elastic (here referred to collectively as "leathery") state, block 29. When the polycarbonate film is transformed to the leathery state, the film has largely no short-range or long-range molecular ordering.

To make the glassy-state-to-leathery state transformation in the polycarbonate structure, the annealing temperature $T_{ann}$ normally must equal or exceed the glass transition temperature $T_g$ of the polycarbonate. However, the annealing temperature $T_{ann}$ should not be high enough to form a rubbery solid or a viscous melt, conditions which could cause significant flow of the polycarbonate. Since these undesirable conditions occur when the polycarbonate is raised to significantly greater than 15° C. above the polycarbonate $T_g$, the annealing temperature $T_{ann}$ lies in a range extending approximately from the polycarbonate $T_g$ to approximately 15° C. above the polycarbonate $T_g$. Typically, the annealing temperature $T_{ann}$ is chosen to be close to 15° C. above the glass transition temperature $T_g$ of the polycarbonate in order to maximize the rate at which the polycarbonate film is transformed to the leathery state without entering the undesirable rubbery state.

After completing the annealing step, the leathery polycarbonate film is quenched (rapidly cooled) so as to make the film hard again while retaining the largely non-ordered molecular microstructure of the leathery state. The annealing and quenching of the solid polycarbonate film can encompass the drying operation, or can be performed as a separate annealing/quenching operation after the film is dried.

The physical microstructure of the polycarbonate changes during the annealing/quenching operation. However, the chemical make-up of the polycarbonate remains substantially the same. If the film was transparent at the end of the drying operation, the film normally remains transparent through the annealing/quenching steps. The annealing/quenching operation typically improves the adhesion of the polycarbonate film to the substructure as well as improving the optical uniformity of the film while decreasing birefringence. If the substructure is not perfectly planar, the annealing/quenching operation also improves the degree of planarization of the surface of the polycarbonate film, although at the expense of film thickness uniformity.

It is preferable to anneal the film in a suitable oven, although a hot plate or other method of heating in a controlled environment may be used. When the polycarbonate is MAKROLON 2608, the annealing is typically done at 160° C. This is approximately 15° C. above the glass transition temperature of MAKROLON 2608. Typically, the structure is annealed for 15 minutes under flowing dry nitrogen at 160° C., and then for 45 minutes under dynamic vacuum at the same temperature.

The polycarbonate film is then cooled rapidly down to room temperature. That is, the polycarbonate film is quenched, again block 29. The cooling rate is typically greater than 0.1° C./s. With the structure removed from the annealing oven, cooling is typically performed under natural convection by placing the structure in dry nitrogen or clean dry air with a relative humidity less than 45%. By cooling the polycarbonate film rapidly through its glass transition temperature $T_g$, the polycarbonate material returns to a hard solid condition while retaining the microstructure of a substantially leathery state. Crystallinity (i.e., short-range and long-range molecular ordering) of the final film is kept to a minimum. The annealing and quenching of the polycarbonate produces an isotropic glass with highly uniform density and near-minimum birefringence.

Figure 5:
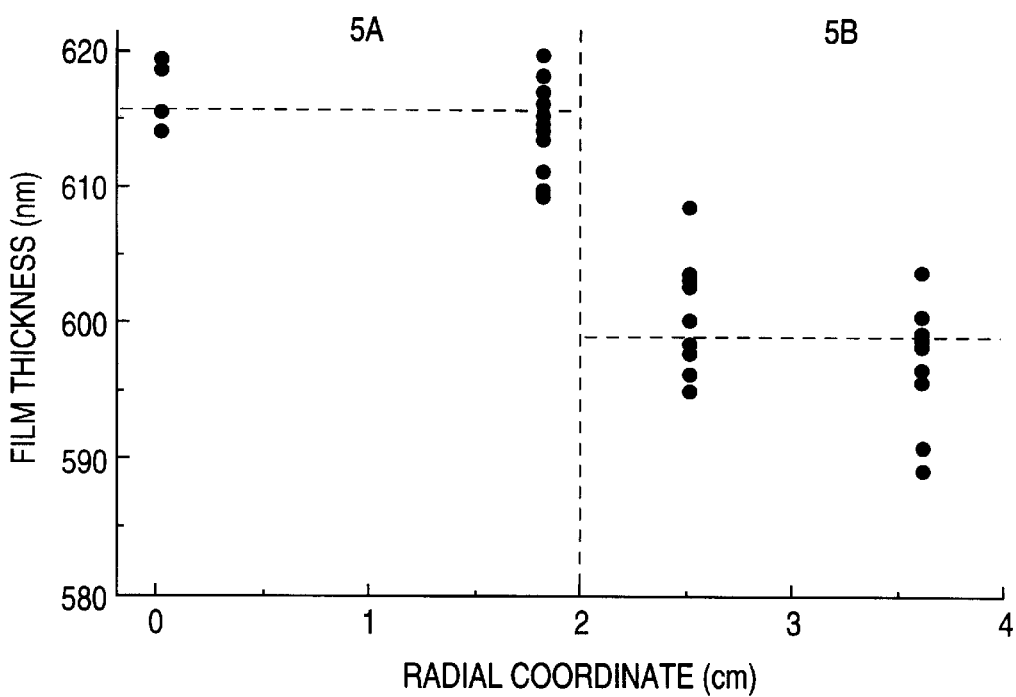
FIG. 5 is a graph which shows the dependence of solid polycarbonate film thickness on the radial coordinate of sampled points for polycarbonate films made by spin coating a polycarbonate-containing solution onto a planar, generally circular substructure according to the invention.

FIG. 5 shows the dependence of dry film thickness on the radial coordinate of the sampled point for a solid polycarbonate film made by spin coating on a planar substructure as described above. The substructure was secured to the spinning chuck by applying vacuum to the rear surface of the substructure through a channel at the center of rotation, i.e., at a radial coordinate of 0. A compliant O-ring made a seal between the vacuum chuck and the substructure at a radial coordinate of 2 cm. Hence, film thickness data measured in region 5A were for the part of the substructure in hard mechanical contact with the spinning chuck, and data measured in region 5B were for the part of the substructure in soft mechanical contact with the spinning chuck.

The film thickness data in region 5A have a 95% confidence interval of 615±6 nm, i.e., this part of the substructure has a film thickness uniformity of ±0.9%. The film thickness data in region 5B have a 95% confidence interval of 599±9 nm, i.e., this part of the substructure has a film thickness uniformity of ±1.5%. The mean values of film thickness in the two regions differ by 2.7%. Considering both regions together gives a 95% confidence interval for the film thickness of 608±20 nm, i.e., the substructure as a whole has a film thickness uniformity of ±3.2%.

The data of FIG. 5 are typical for solid polycarbonate films formed by spin coating. Reproducibility from film to film is a function of the reproducibility of the coating method, but mean film thicknesses typically exhibit variations of no more than ±2% when spin coating is used to prepare the films, and rotation speeds are maintained constant to a precision better than ±1%.

FIGS. 6a–6d (collectively "FIG. 6") pictorially illustrate how the present polycarbonate-containing liquid chemical formulation is applied to the substructure and then processed to make the polycarbonate film. In particular, the processing steps of blocks 26 and 28 of FIG. 3 are largely shown in FIG. 6.

Figure 6A:
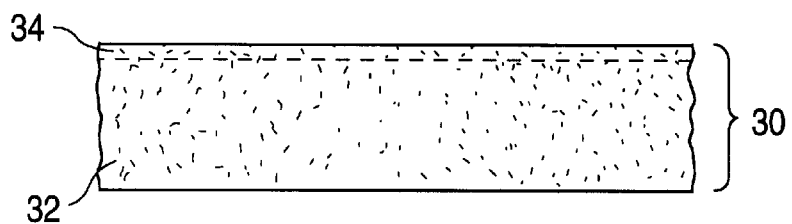
FIGS. 6a–6d are cross-sectional views illustrating operations performed on a substructure to create a polycarbonate film according to the process of FIG. 3.

The starting point in FIG. 6a is a substructure 30 whose primary constituent is typically a body 32 of electrically non-insulating material, i.e., body 32 and substructure 30 typically consist of electrically conductive and/or semiconductive material. Alternatively, body 30 may partially or wholly consist of electrically insulating material which may be coated with non-insulating material, or body 30 may be entirely composed of insulating material. An adhesion-promoting or wetting layer 34 is optionally situated along the upper surface of body 32. In any case, substructure 30 is usually in the shape of a plate having a substantially flat upper surface.

Figure 6B:
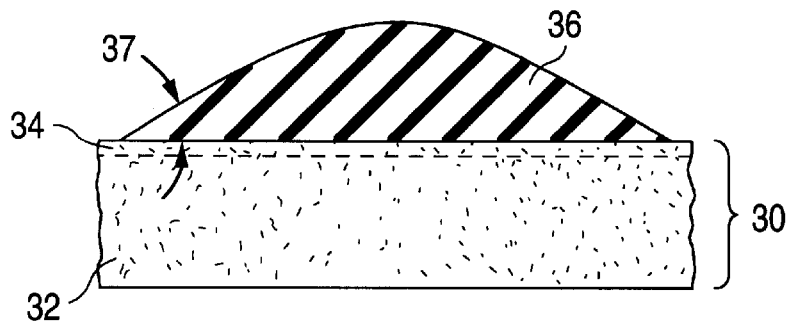

A portion 36 of the polycarbonate-containing liquid chemical formulation is deposited on top of substructure 30 as indicated schematically in FIG. 6b. The wetting of polycarbonate-containing liquid portion 36 on substructure surface 32 should be such that the contact angle 37 of portion 36 is substantially less than 90°, as shown.

Figure 6C:
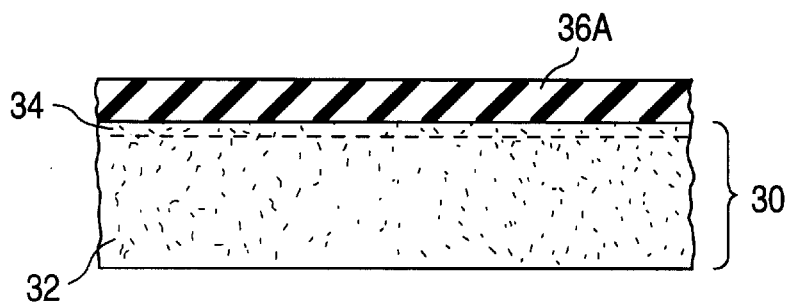

Either during or subsequent to the delivery of portion 36 of the liquid chemical formulation, the structure formed by substructure 30 and liquid portion 36 is spun using a suitable apparatus to convert portion 36 into a polycarbonate-containing liquid film 36A of the liquid formulation. See FIG. 6c. By appropriately controlling the speed, acceleration and duration of rotation, the kinematic viscosity of the formulation, and the concentration of the polycarbonate and other solid material such as surfactant, liquid film 36A achieves a highly uniform thickness across the substructure. In the structure of FIG. 6c, liquid film 36A has substantially all of the characteristics of the liquid chemical formulation of the invention.

Figure 6D:
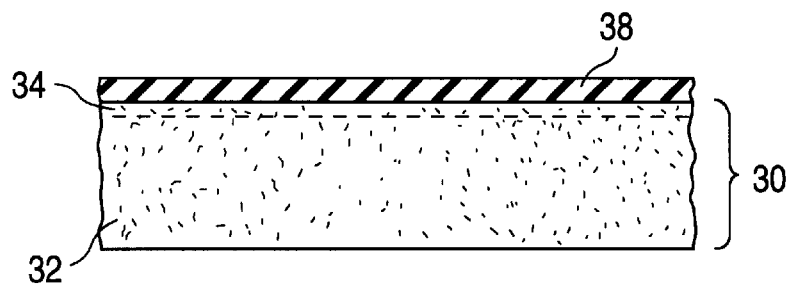

The liquid chemical formulation is then processed to remove the polycarbonate solvent and any other volatile constituents. Liquid film 36A is thus converted into a solid polycarbonate film 38 as shown in FIG. 6d. This transformation is accomplished during the drying and/or annealing operations described above. Polycarbonate film 38 is now ready for use in a desired application.

Experiments

Liquid films of samples of the present liquid chemical formulation were created on the upper surfaces of largely identical chromium-coated glass substructures. Each substrate consisted of a circular glass substrate of 100-cm diameter and an overlying layer of chromium deposited by evaporation to a thickness of approximately 40 nm on the substrate. Standard mixing/homogenization techniques were employed in each instance of mixing polycarbonate material and polycarbonate solvent. All film thicknesses were measured with a Ditak film thickness measurement system.

Experiment A—MAKROLON 2608 and Pyridine

Five different samples SA1–SA5 of the liquid chemical formulation of the invention were prepared with MAKROLON 2608 polycarbonate and pyridine to achieve respective polycarbonate mass concentrations of approximately 5, 6, 7, 8 and 9% of the liquid chemical formulation. Specifically, 0.81, 0.97, 1.13, 1.29 and 1.48 g of MAKROLON 2608 were respectively mixed with 14.7, 14.8, 14.9, 14.9 and 14.7 g of dried (anhydrous) pyridine until formulations SA1–SA5 were respectively formed as stable solutions at 54.8, 65.2, 75.5, 86.9 and 99.7 g polycarbonate/kg pyridine. The kinematic viscosities of formulations SA1–SA5 were respectively measured at 6.2, 8.3, 10.9, 14.4 and 19.8 centistokes. The kinematic viscosity data for formulations SA1–SA5 is presented in FIG. 1a.

5-ml portions of formulations SA1–SA5 were respectively spun onto five of the chromium-coated glass substructures for 30 s at respective spin speeds of 1010, 1010, 1020, 1050 and 1000 rpm to produce five liquid films from formulations SA1–SA5. The five liquid films were dried for 10 s at 120° C. with a hot plate to produce solid polycarbonate films. The dried polycarbonate films were then annealed at 155° C. for 15 minutes under dry nitrogen and then at 155° C. for 45 minutes under a vacuum at approximately 10 torr. The thicknesses of the resultant five annealed solid polycarbonate films created from formulations SA1–SA5 were respectively measured at 440, 630, 800, 1,000 and 1320 nm.

Additional 5-ml portions of formulations SA1–SA5 were respectively spun onto five of the chromium-coated glass substrates for 30 s respectively at spin speeds of 2010, 1990, 1980, 2020 and 2010 rpm to produce five additional liquid films from formulations SA1–SA5. After thermally processing the additional five liquid films in the preceding manner, the thicknesses of the resultant five additional annealed solid polycarbonate films created from formulations SA1–SA5 at the higher spin speeds were respectively measured at 330, 450, 570, 720 and 930 nm.

Further 5-ml portions of formulations SA1–SA5 were respectively spun onto five of the chromium-coated glass substrates for 30 s respectively at a spin speed of 4,000 rpm to produce five further liquid films from formulations SA1–SA5. After thermally processing the further liquid films in the preceding manner, the thicknesses of the resultant five further annealed solid polycarbonate films created from formulations SA1–SA5 at the even higher spin speed were respectively measured at 240, 320, 400, 510 and 660 nm.

FIG. 4 presents the film thickness data for these 15 MAKROLON 2608 polycarbonate films as a function of spin speed.

Experiment B—MAKROLON CD2005 and Pyridine:

Five different samples SB1–SB5 of the present liquid chemical formulation were prepared with MAKROLON CD2005 polycarbonate and pyridine to achieve respective polycarbonate mass concentrations of approximately 5, 6, 7, 8 and 9% of the liquid chemical formulation. Specifically, 0.81, 0.95, 1.14, 1.28 and 1.46 g of MAKROLON CD2005 were respectively mixed with 15.1, 15.0, 15.1, 14.9 and 15.0 g of dried pyridine until formulations SB1–SB5 were respectively formed as stable solutions at 53.6, 63.4, 75.4, 86.2 and 97.7 g polycarbonate/kg pyridine. The kinematic viscosities of formulations SB1–SB5 were respectively measured at 4.0, 4.9, 6.5, 8.1 and 10.1 centistokes. The kinematic viscosity data for formulations SB1–SB5 is presented in FIG. 1a.

5-ml portions of formulations SB1–SB5 were respectively spun onto five of the chromium-coated glass substructures for 30 s at respective spin speeds of 1,000, 1,000, 1,010, 990 and 990 rpm to produce five liquid films from formulations SB1–SB5. After thermally processing the liquid films in the manner specified in Experiment A, the thicknesses of the resultant five annealed solid polycarbonate films created from formulations SB1–SB5 were respectively measured at 380, 480, 640, 750 and 640 nm.

Additional 5-ml portions of formulations SB1–SB4 were respectively spun onto four of the chromium-coated glass substructures for 30 s respectively at spin speeds of 1,620, 2,000, 1,980 and 1,990 rpm to produce four additional liquid films from formulations SB1–SB4. After thermally processing the additional liquid films in the manner specified in Experiment A, the thicknesses of the resultant four additional annealed solid polycarbonate films created from formulations SB1–SB4 at the higher spin speeds were respectively measured at 290, 330, 440 and 520 nm.

Further 5-ml portions of formulations SB1–SB4 were spun onto four of the chromium-coated glass substructures for 30 s respectively at spin speeds of 4,020, 4,000, 4,010 and 3,700 rpm to produce four further liquid films from formulations SB1–SB4. After thermally processing the further liquid films in the manner specified in Experiment A, the thicknesses of the resultant four further annealed solid polycarbonate films created from formulations SB1–SB4 at the even higher spin speeds were respectively measured at 190, 230, 310 and 420 nm.

Experiment C—MAKROLON 3208 and Pyridine

Three different samples SC1–SC3 of the present liquid chemical formulation were prepared with MAKROLON 3208 polycarbonate and pyridine to achieve respective polycarbonate mass concentrations of approximately 5, 6 and 9% of the liquid chemical formulation. MAKROLON 3208, made by Bayer, has a molecular weight of approximately 33,000. Specifically, 0.79, 0.99, and 1.50 g of MAKROLON 3208 were respectively mixed with 14.7, 15.0 and 15.0 g of dry pyridine until formulations SC1–SC3 were respectively formed as stable solutions at 53.8, 66.2 and 100.1 g polycarbonate/kg pyridine. The kinematic viscosities of formulations SC1–SC3 were respectively measured at 7.4, 9.9, and 25.8 centistokes.

5-ml portions of formulations SC1–SC3 were respectively spun onto three of the chromium-coated glass substructures for 30 s at respective spin speeds of 650, 800 and 1400 rpm to produce three liquid films from formulations SC1–SC3. After thermally processing the three liquid films in the manner specified in Experiment A, the thicknesses of the resultant three annealed solid polycarbonate films created from formulations SC1–SC3 were respectively measured at 480, 520 and 930 nm.

Additional 5-ml portions of formulations SC1 and SC2 were spun onto two of the chromium-coated glass substructures for 30 s respectively at spin speeds of 1180 and 1160 rpm to produce two additional liquid films from formulations SC1 and SC2. After thermally processing the additional liquid films in the manner specified in Experiment A, the thicknesses of the resultant two additional annealed solid polycarbonate films created from formulations SC1 and SC2 were respectively measured at 480 and 520 nm.

Experiment D—LEXAN® 3810–1111 and Pyridine

A sample SD1 of the present liquid chemical formulation was prepared with LEXAN 3810–1111 polycarbonate and pyridine to achieve a polycarbonate mass concentration of approximately 10% of the liquid chemical formulation. LEXAN 3810–1111, made by General Electric Co., has a molecular weight of approximately 30,000. Specifically, 1.70 g of LEXAN 3810–1111 was mixed with 15.0 g of dried pyridine until formulation SD1 was formed as a stable solution at 113.6 g polycarbonate/kg pyridine.

A 5-ml portion of formulation SD1 was spun onto one of the chromium-coated glass substructure for 30 s at a spin speed of 1420 rpm to produce a liquid film from formulation SD1. After thermally processing the liquid film in the manner specified in Experiment A, the thickness of the resultant annealed solid polycarbonate film created from formulation SD1 was measured at 700 nm.

Experiment E—MAKROLON 2608, Pyridine and Surfactant

A stock solution of MAKROLON 2608 polycarbonate and dry pyridine was prepared to a polycarbonate mass concentration of approximately 7% of the solution, specifically a concentration of 75 g polycarbonate/kg pyridine. Using three different surfactants, three different stock mixtures ME1–ME3 of pyridine with surfactant were prepared to a concentration of 1.76 g surfactant/kg mixture. In particular, 1.77 g of Fluorad FC-430 surfactant was mixed with 1.0 l of dried pyridine to form mixture ME1. 1.77 g of Fluorad FC-431 surfactant was mixed with 1.0 l of dried pyridine to form mixture ME2. 1.77 g of Fluorad FC-740 surfactant was mixed with 1.0 l of dried pyridine to form mixture ME3. As with the FC-430 surfactant, each of the FC-431 and FC-740 surfactants is a viscous liquid mixture of fluoroaliphatic polymeric esters made by Minnesota Manufacturing and Mining Co.

Three samples SE1A–SE1C of the present liquid chemical formulation were prepared with FC-430 surfactant mixture MD1 by respectively adding 3.25, 7.5 and 10.0 g of mixture ME1 to three 500-ml aliquots of the stock MAKROLON 2608 /pyridine solution. Three samples SE2A–SE2C of the liquid chemical formulation were similarly prepared with FC-431 surfactant mixture ME2 by respectively adding 3.25, 7.5 and 10.0 g of mixture ME2 to three 500-ml aliquots of the stock MAKROLON 2608 /pyridine solution. Three samples SE3A SE3C of the liquid chemical formulation were prepared with FC-740 surfactant mixture ME3 by respectively adding 3.25, 7.5 and 10.0 g of mixture ME3 to three 500-ml aliquots of the stock MAKROLON 2608/pyridine solution.

5-ml portions of formulations SE1A–SE1C, SE2A–SE2C and SE3A–SE3C were respectively spun at 1120 rpm for 30 s onto nine of the chromium-coated glass substructures to form nine different liquid films. The thermal processing steps described in Experiment A were employed to transform the liquid films of formulations SE1A–SE1C, SE2A–SE2C and SE3A–SE3C respectively into nine annealed solid polycarbonate films. The film thicknesses for the solid polycarbonate films created from formulations SE1A–SE1C, SE2A–SE2C and SE3A–SE3C all were measured at 750 nm±35 nm.

Experiment F—MAKROLON 2608 and 1-methylpyrrolidinone

Four different samples SF1–SF4 of the present liquid chemical formulation were prepared with MAKROLON 2608 polycarbonate and 1-methylpyrrolidinone (again, NMP) to achieve respective polycarbonate mass concentrations of approximately 2, 5, 7 and 9% of the liquid chemical formulation. Specifically, 0.44, 1.04, 1.55 and 2.06 g of MAKROLON 2608 were respectively mixed with 20.6, 20.6, 20.6 and 20.5 g of dried 1-methylpyrrolidinone until formulations SF1–SF4 were respectively formed as stable solutions at 21.4, 50.4, 75.3 and 100.4 g polycarbonate/kg 1-methylpyrrolidinone. The kinematic viscosities of formulations SF1–SF4 were respectively measured at 2.3, 4.8, 7.7 and 14.3 centistokes. FIG. 1$b$ presents the kinematic viscosity data for formulations SF1–SF4 along with the kinematic viscosity data for formulations SA1–SA5, also having MAKROLON 2608 as the polycarbonate material, but utilizing pyridine as the polycarbonate solvent rather than 1-methylpyrrolidinone.

5-ml portions of formulations SF1–SF4 were respectively spun onto four of the chromium-coated glass substructures for 60 s at respective spin speeds of 750, 1000, 1500 and 2000 rpm to produce liquid films from formulations SF1–SF4. After thermally processing the liquid films in the manner specified in Experiment A, the thicknesses from the resultant four annealed solid polycarbonate films created from formulations SF1–SF4 were respectively measured at 730, 370, 340 and 310 nm.

Experiment G—MAKROLON 2608 and Polycarbonate Solvents other than Pyridine and 1-methylpyrrolidinone 21 different samples SG1–SG21 of the present liquid chemical formulation are prepared with MAKROLON 2608 polycarbonate and polycarbonate solvents other than pyridine and 1-methylpyrrolidinone to achieve polycarbonate mass concentrations of approximately 5% of the liquid chemical formulation. Specifically, each of formulations SG1–SG21 is formed by mixing 0.8 g of MAKROLON 2608 with 15.0 g of a different one of the 21 polycarbonate solvents using standard mixing/homogenization techniques until a stable solution of each of formulations SG1–SG21 is formed at 53.3 g polycarbonate/kg polycarbonate solvent. The kinematic viscosities of formulations SG1–SG21 are measured.

The 21 polycarbonate solvents for formulations SG1–SG21 respectively are 4-ethylpyridine, 2,3- dimethylpyridine, 3,4-dimethylpyridine, 2-ethyl-4-methylpyridine, 3-ethyl-4-methylpyridine, 5-ethyl-2-methylpyridine, 2-isopropylpyridine, 2-n-propylpyridine, 3-phenylpyridine, 2-fluoropyridine, 2-chloropyridine, 2-bromopyridine, 4-methoxypyridine, 1-methylpyrrole, 2,4-dimethylpyrrole, 2-isopropylpyridine, 1-propylpyrrole, 1-butylpyrrole, 1-ethyl-2-pyrrolidinone, 1-tert-butylpyrrole, and 1-cyclohexylpyrrolidinone.

5-ml portions of formulations SG1–SG21 are respectively spun onto 21 of the chromium-coated glass substructures for 30 s at 1,000 rpm to produce 21 liquid films of formulations SG1–SG21. The 21 liquid films are then thermally processed as specified in Experiment A to respectively produce 21 annealed solid polycarbonate films. Using a Ditak film thickness measurement system, the thicknesses of the 21 solid polycarbonate films created from formulations SG1–SG21 are measured.

Variations

While the invention has been described with reference to particular embodiments, this description is solely for the purpose of illustration and is not to be construed as limiting the scope of the invention claimed below. For example, the process flow of FIGS. 3 and 6 can be modified in various ways. Instead of forming liquid film 36A by spin coating part of the liquid chemical formulation over substructure 30, film 36A can be created by dipping substructure 30 into the formulation to form the liquid film. Alternatively, film 36A may be created by meniscus coating, by extrusion, by spraying, or by spreading the liquid using a doctor blade or similar device.

Certain polycarbonate solvents generally suitable for use in the present liquid chemical formulation oxidize to an unacceptable degree during storage of the formulation, thereby reducing the useful storage life of the formulation. 1-methylpyrrolidinone (NMP) is such an oxidizable polycarbonate solvent. Oxidation typically occurs due to the formation of free radicals when the formulation is exposed to oxygen or a reactive metal surface.

A stabilizer—e.g., 4-tert-butylcatechol or quinone in the case of 1-methylpyrrolidinone—can be employed in the present polycarbonate-containing liquid chemical formulation to inhibit oxidation of the polycarbonate solvent. The stabilizer typically operates by acting preferentially with the free radicals to form stable unreactive products. The stabilizer is employed at a low concentration, typically less than 0.0001% by mass (100 parts per million) of the formulation, and thus constitutes a minor component of the formulation.

The polycarbonate-dissolving liquid chemical formulation of the invention may, as indicated above be formed with two or more polycarbonate solvents. A multiple-solvent formulation can be utilized to improve the polycarbonate film-forming properties in extrusion coating applications or in making polycarbonate films of large surface area. All of the polycarbonate solvent candidates described above can be employed in multiple-solvent formulations.

In a two-solvent formulation, the solvent mix percentage for each solvent can vary from less than 1% by mass of the formulation to more than 99% by mass of the formulation. For example, a two-solvent formulation may contain 1 part of pyridine to 2 parts 1-methylpyrrolidinone.

Two or more polycarbonates can similarly be employed to form the polycarbonate material in the present liquid chemical formulation. This includes polycarbonates with the same repeating unit but different molecular weights. Various modifications and applications may thus be made by those skilled in the art without departing from the true scope and spirit of the invention as defined by the appended claims.

We claim:

1. A liquid chemical formulation comprising:
polycarbonate material; and
a liquid (a) capable of dissolving the polycarbonate material to a concentration of at least 1% by mass of the liquid formulation at 20° C. and 1 atmosphere, (b) having a boiling point of at least 80° C. at 1 atmosphere, and (c) having a protonated from whose acid dissociation constant is greater than $10^{-8}$ at 20° C. and 1 atmosphere, the polycarbonate material being dissolved in the liquid so as to be present in the liquid at a higher mass fraction than any other constituent present in the liquid, the polycarbonate material also constituting largely all the solid material present in the liquid.

2. A liquid formulation as in claim 1 wherein the polycarbonate material has a molecular weight of at least 10,000.

3. A liquid formulation as in claim 2 wherein the molecular weight of the polycarbonate material is 30,000–35,000.

4. A liquid formulation as in claim 1 wherein the polycarbonate material is 1–50% by mass of the liquid formulation.

5. A liquid formulation as in claim 1 wherein the liquid is capable of dissolving solid polycarbonate to a concentration of at least 5% by mass of the liquid formulation at 20° C. and 1 atmosphere.

6. A liquid formulation as in claim 1 wherein the polycarbonate material has a glass transition temperature of at least 65° C.

7. A liquid formulation as in claim 1 wherein the boiling point of the liquid is no more than ($T_g$+15° C.) at 0.001 atmosphere, where $T_g$ is the glass transition temperature of the polycarbonate material.

8. A liquid formulation as in claim 1 wherein the liquid formulation has a kinematic viscosity of no more than 100 centistokes at 20° C. and 1 atmosphere.

9. A liquid formulation as in claim 8 wherein the kinematic viscosity of the liquid formulation is 2–25 centistokes at 20° C. and 1 atmosphere.

10. A liquid formulation as in claim 1 having no more than 1% water by mass.

11. A liquid formulation as in claim 1 further including a surfactant.

12. A liquid formulation as in claim 1 further including an adhesive or adhesion promoter.

13. A liquid formulation as in claim 1 wherein the polycarbonate material is representable as:

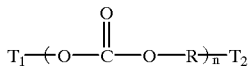

where:
O is an oxygen atom;
C is a carbon atom;
R is a bivalent group;
each of $T_1$ and $T_2$ is a terminating group;
n is a plural integer; and

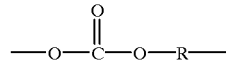

is a monomeric repeating unit repeated n times.

14. A liquid formulation as in claim 1 wherein the liquid comprises at least one of pyridine and a ring-substituted pyridine derivative, both pyridine and the pyridine derivative being representable as:

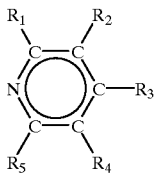

where:
N is a nitrogen atom;
C is a carbon atom; and
each of $R_1$, $R_2$, $R_3$, $R_4$, and $R_5$ is a monovalent covalent substituent.

15. A liquid formulation as in claim 1 wherein the liquid comprises at least one of pyrrole and a ring-substituted pyrrole derivative, both pyrrole and the pyrrole derivative being representable as:

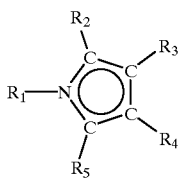

where:
N is a nitrogen atom;
C is a carbon atom; and
each of $R_1$, $R_2$, $R_3$, $R_4$ and $R_5$ is a monovalent covalent substituent.

16. A liquid formulation as in claim 1 wherein the liquid comprises at least one pyrrolidine and a derivative, both pyrrolidine and the pyrrolidine derivative being generally representable as:

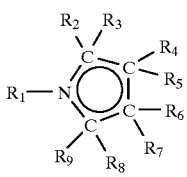

where: N is a nitrogen atom;
C is a carbon atom; and
each of $R_1$, $R_2$, $R_3$, $R_4$, $R_5$, $R_6$, $R_7$ $R_8$, and $R_9$ is a monovalent covalent substituent subject to any pair of $R_2$–$R_9$ on any of the carbon atoms being replaced with a single bivalent sibstituent double covalently bonded to that carbon atom, or/and up ton one pair of $R_2$–$R_9$ on an adjacent pair of carbon atoms being replaced with a covalent bond between that pair of carbon atoms to create a double covalent bond therebetween, or/and $R_1$ and $R_9$ to create a double convalent bond therebetween.

17. A liquid formulation as in claim 1 wherein the liquid comprises cyclohexanone.

18. A liquid chemical formulation comprising:
polycarbonate material; and
a liquid comprising at least one of pyridine and a ring-substituted pyridine derivative, the polycarbonate material being dissolved in the liquid at a higher mass fraction than any other constituent present in the liquid.

19. A liquid formulation as in claim 18 wherein the polycarbonate material has a molecular weight of at least 10,000.

20. A liquid formulation as in claim 18 wherein the polycarbonate material is 0.5–50% by mass of the liquid formulation.

21. A liquid formulation as in claim 18 wherein the polycarbonate material has a glass transition temperature of at least 65° C.

22. A liquid formulation as in claim 18 wherein both pyridine and the pyridine derivative are representable as:

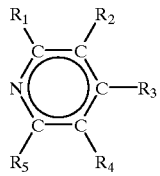

where:
N is nitrogen;
C is carbon; and
each of $R_1$, $R_2$, $R_3$, $R_4$, and $R_5$ is a monovalent covalent substituent.

23. A liquid formulation as in claim 22 wherein each of $R_1$–$R_5$ is a hydrogen atom, a deuterium atom, a hydrocarbon group, a substituted hydrocarbon group, an acetyl group, a carboxaldehyde group, a halogen, or a pseudo-halogen substituent.

24. A liquid formulation as in claim 22 wherein one of $R_1$–$R_5$ is an alkyl group.

25. A liquid formulation as in claim 24 wherein the alkyl group has up to four carbon atoms.

26. A liquid formulation as in claim 22 wherein at least two adjacent ones of $R_1$–$R_5$ form a fused ring or a derivative of a fused ring.

27. A liquid formulation as in claim 22 wherein at least one of $R_1$–$R_5$ is a chlorine, fluorine, bromine, or iodine atom.

28. A liquid formulation as in claim 22 wherein one of $R_1$–$R_5$ is a pseudo-halogen substituent constituted as a nitrile group.

29. A liquid formulation as in claim 18 wherein the liquid consists substantially of pyridine.

30. A liquid formulation as in claim 18 wherein the liquid has a boiling point of at least 80° C. at 1 atmosphere.

31. A liquid formulation as in claim 18 wherein the protonated form of the liquid in aqueous solution has an acid dissociation constant greater than $10^{-8}$ at 20° C. and 1 atmosphere.

32. A liquid formulation as in claim 18 wherein the polycarbonate material is representable as:

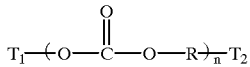

where:
O is an oxygen atom;
C is a carbon atom;
R is a bivalent group;

each of $T_1$ and $T_2$ is a terminating group;
n is a plural integer; and

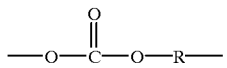

is a monomeric repeating unit repeated n times.

33. A liquid formulation as in claim 32 wherein R is

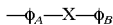

where:
each of $\phi_A$ and $\phi_B$ is a phenylene group or a ring-substituted phenylene group; and
X is an alkylene group, an ether, a sulfide group, or a sulfone group.

34. A liquid formulation as in claim 32 wherein R is:

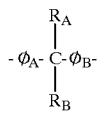

where:
each of $\phi_A$ and $\phi_B$ is a phenylene group or a ring-substituted phenylene group; and
each of $R_A$ and $R_B$ is a hydrogen atom, a deuterium atom, or a monovalent hydrocarbon group.

35. A liquid formulation as in claim 34 wherein at least one of $R_A$ and $R_B$ is a hydrocarbon group constituted as an alkyl group.

36. A liquid formulation as in claim 35 wherein each of $R_A$ and $R_B$ is a methyl group, and each of $\phi_A$ and $\phi_B$ is an unsubstituted 1,4-phenylene group.

37. A liquid chemical formulation comprising:
polycarbonate material and
a liquid comprising at least one of pyrrole and a ring-substituted pyrrole derivative, the polycarbonate material being dissolved in the liquid so as to be present in the liquid at a higher mass fraction than any other constituent present in the liquid.

38. A liquid formulation as in claim 37 wherein the polycarbonate material has a glass transition temperature of at least 65° C.

39. A liquid formulation as in claim 37 wherein the liquid has a boiling point of at least 80° C. at 1 atmosphere.

40. A liquid formulation as in claim 37 wherein the protonated form of the liquid in aqueous solution has an acid dissociation constant greater than $10^{-8}$ at 20° C. and 1 atmosphere.

41. A liquid formulation as in claim 37 wherein both pyrrole and the pyrrole derivative are representable as:

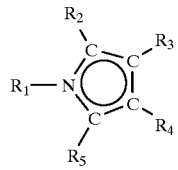

where:
N is a nitrogen atom;
C is a carbon atom; and
each of $R_1$, $R_2$, $R_3$, $R_4$, and $R_5$ is a monovalent covalent substituent.

42. A liquid formulation as in claim 41 wherein each of $R_1$–$R_5$ is a hydrogen atom, a deuterium atom, a hydrocarbon group, a substituted hydrocarbon group, an acetyl group, a carboxaldehyde group, a halogen, or a pseudo-halogen substituent.

43. A liquid formulation as in claim 41 wherein $R_1$ is an alkyl group.

44. A liquid formulation as in claim 41 wherein at least two adjacent ones of $R_1$–$R_5$ form a fused ring or a derivative of a fused ring.

45. A liquid formulation as in claim 41 wherein at least one of $R_1$–$R_5$ is a chlorine, fluorine, bromine, or iodine atom.

46. A liquid formulation as in claim 37 wherein the polycarbonate material is representable as:

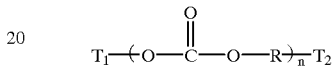

where:
O is an oxygen atom;
C is a carbon atom;
R is a bivalent group;
each of $T_1$ and $T_2$ is a terminating group;
n is a plural integer; and

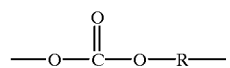

is a monomeric repeating unit repeated n times.

47. A liquid formulation as in claim 46 wherein R is:

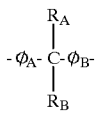

where:
each of $\phi_A$ and $\phi_B$ is a phenylene group or a ring-substituted phenylene group; and
each of $R_A$ and $R_B$ is a hydrogen atom, a deuterium atom, or a monovalent hydrocarbon group.

48. A liquid chemical formulation comprising :
polycarbonate material; and
a liquid comprising at least one pyrrolidine and a pyrrolidine derivative, the polycarbonate material being dissolved in the liquid so as to be present in the liquid at a higher mass fraction than any other constituent present in the liquid.

49. A liquid formulation as in claim 48 wherein the polycarbonate material has a glass transition temperature of at least 65° C.

50. A liquid formulation as in claim 48 wherein the liquid has a boiling point of at least 80° C. at 1 atmosphere.

51. A liquid formulation as in claim 48 wherein the protonated form of the liquid in aqueous solution has an acid dissociation constant greater than $10^{-8}$ at 20° C. and 1 atmosphere.

52. A liquid formulation as in claim 48 wherein both pyrrolidine and the pyrrolidine derivative are generally representable as:

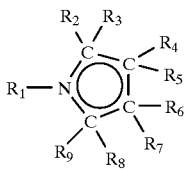

wherein: N is a nitrogen atom;

C is a carbon atom;

each of $R_1$, $R_2$, $R_3$, $R_4$, $R_5$, $R_6$, $R_7$, $R_8$, and $R_9$, is a monovalent covalent substituent subject to any pair of $R_2$–$R_9$ on any of the carbon atoms being replaced with a single bivalent substituent double covalently bonded to that carbon atom, or/and up to one pair of $R_2$–$R_9$ on an adjacent pair of carbon atoms being replaced with acovalent bond between that pair of carbon atoms to create a double covalent bond therebetween, or/and $R_1$ and $R_2$ being replaced with a covalent bond between the nitrogen atom and the carbon atom bonded to $R_2$ create a double covalent bond therebetween.

53. A liquid formulation as in claim 42 wherein each of $R_1$–$R_9$ is a hydrogen atom, a deuterium atom, a hydrocarbon group, a substituted hydrocarbon group, an acetyl group, a carboxaldehyde group, a halogen, or a pseudo-halogen substituent.

54. A liquid formulation as in claim 52 wherein $R_3$ and $R_4$ are replaceable with a covalent bond, and $R_1$ is not hydrogen or deuterium.

55. A liquid formulation as in claim 52 wherein $R_2$ and $R_3$ are replaced with a single bivalent substituent, and $R_1$ is not hydrogen or deuterium.

56. A liquid formulation as in claim 52 wherein at least one of $R_1$–$R_9$ is not hydrogen or deuterium.

57. A liquid formulation as in claim 48 wherein the polycarbonate material is representable as:

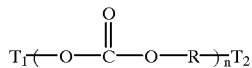

where:

O is an oxygen atom;

C is a carbon atom;

R is a bivalent group;

each of $T_1$ and $T_2$ is a terminating group;

n is a plural integer; and

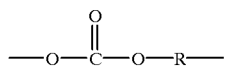

is a monomeric repeating unit repeated n times.

58. A liquid formulation as in claim 57 wherein R is:

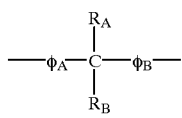

where:

each of $\phi_A$ and $\phi_B$ is a phenylene group or a ring-substituted phenylene group; and each of $R_A$ and $R_B$ is a hydrogen atom, a deuterium atom, or a monovalent hydrocarbon group.

59. A liquid chemical formulation comprising:

polycarbonate material; and a liquid comprising cyclohexanone, the polycarbonate material being dissolved in the liquid so as to be present in the liquid at a higher mass fraction than any other constituent present in the liquid.

60. A liquid formulation as in claim 59 wherein the polycarbonate material has a glass transition temperature of at least 65° C.

61. A structure comprising:

a substructure; and a liquid film situated over the substructure, the liquid film comprising:

polycarbonate material; and a liquid (a) capable of dissolving the polycarbonate material to a concentration of at least 1% by mass of the liquid film at 20° C. and 1 atmosphere, (b) having a boiling point of at least 80° C. at 1 atmosphere, and (c) having a protonated form whose acid dissociation constant is greater than $10^{-8}$ at 20° C. and 1 atmosphere, the polycarbonate material being dissolved in the liquid so as to be present in the liquid at a higher mass fraction than any other constituent present in the liquid, the polycarbonate material also constituting largely all the solid material present in the liquid.

62. A structure as in claim 61 wherein the boiling point of the liquid is no more than ($T_g$+15° C.) at 0.001 atmosphere, where $T_g$ is the glass transition temperature of the polycarbonate material.

63. A structure as in claim 61 wherein the polycarbonate material has a glass transition temperature of at least 65° C.

64. A structure as in claim 61 wherein the liquid film has a kinematic viscosity of no more than 100 centistokes at 20° C. and 1 atmosphere.

65. A structure as in claim 61 wherein the substructure includes an adhesion layer situated below the liquid film along the substructure's upper surface.

66. A structure comprising:

a substructure; and a liquid film situated over the substructure, the liquid film comprising (a) polycarbonate material and (b) a liquid comprising at least one of pyridine, a ring-substituted pyridine derivative, pyrrole, a ring-substituted pyrrole derivative, pyrrolidine, a pyrrolidine derivative, and cyclohexanone, the polycarbonate material being dissolved in the liquid so as to be present in the liquid at a higher mass fraction than any other constituent present in the liquid.

67. A structure as in claim 66 wherein the protonated form of the liquid in aqueous solution has an acid dissociation constant greater than $10^{-8}$ at 20° C. and 1 atmosphere.

68. A structure as in claim 66 wherein the liquid has a boiling point of at least 80° C. at 1 atmosphere.

69. A structure as in claim 66 wherein the polycarbonate material has a glass transition temperature of at least 65° C.

70. A method comprising the steps of:

providing a liquid chemical formulation by a procedure that entails dissolving polycarbonate material in a liquid (a) capable of dissolving the polycarbonate material to a concentration of at least 1% by mass of the liquid formulation at 20° C. and 1 atmosphere, (b) having a boiling point of at least 80° C. at 1 atmosphere, and (c) having a protonated form whose acid dissociation constant is greater than $10^{-8}$ at 20° C. and 1 atmosphere such that the polycarbonate material is present in the liquid at a higher mass fraction than any other constituent present in the liquid and such that the polycarbonate material constitutes largely all the solid material present in the liquid;

forming a liquid film of the liquid formulation over a substructure; and processing the liquid film to largely remove the liquid and convert the polycarbonate material in the liquid film into a solid, largely polycarbonate, film.

71. A method as in claim 70 wherein the providing step includes providing the liquid formulation with a surfactant.

72. A method as in claim 70 wherein the providing step includes drying the polycarbonate material and/or the liquid to remove water.

73. A method as in claim 70 wherein the forming step comprises spin coating at least part of the liquid formulation over the substructure.

74. A method as in claim 70 wherein the processing step comprises drying the liquid film.

75. A method as in claim 74 wherein the polycarbonate material is characterized by a glass transition temperature $T_g$, the drying step being performed at a maximum temperature no more than approximately 15° C. above $T_g$.

76. A method as in claim 75 wherein the maximum temperature during the drying step is less than $T_g$.

77. A method as in claim 70 wherein the processing step includes transforming the polycarbonate material from a glass-like microstructure having some short-range molecular ordering to a microstructure having largely no short-range or long-range molecular ordering.

78. A method as in claim 77 wherein the polycarbonate material is characterized by a glass transition temperature $T_g$, the transforming step being performed at a maximum temperature in the range extending from approximately $T_g$ to approximately 15° C. above $T_g$.

79. A method comprising the steps of:

providing a liquid chemical formulation by a procedure that entails dissolving polycarbonate material in a liquid comprising at least one of pyridine, a ring-substituted pyridine derivative, pyrrole, a ring-substituted pyrrole derivative, pyrrolidine, a pyrrolidine derivative, and cyclohexanone such that the polycarbonate material is present in the liquid at a higher mass fraction than any other constituent present in the liquid and such that the polycarbonate material constitutes largely all the solid material present in the liquid;

forming a liquid film of the liquid formulation over a substructure; and processing the liquid film to largely remove the liquid and convert the polycarbonate material in the liquid film into a solid, largely polycarbonate, film.

80. A method as in claim 79 wherein the protonated form of the liquid in aqueous solution has an acid dissociation constant greater than $10^{-8}$ at 20° C. and 1 atmosphere.

81. A method as in claim 79 wherein the providing step comprises combining the liquid and the polycarbonate material in a substantially water-free environment.

82. A method as in claim 79 wherein the forming step comprises spin coating at least part of the liquid formulation over the substructure in a substantially water-free environment.

83. A method as in claim 79 wherein the processing step comprises drying the liquid film.

84. A method as in claim 83 wherein the polycarbonate material is characterized by a glass transition temperature $T_g$, the drying step being performed at a maximum temperature no more than approximately 15° C. above $T_g$.

85. A method as in claim 79 wherein the processing step includes converting the polycarbonate material from a glass-like microstructure having some short-range molecular ordering to a microstructure having largely no short-range or long-range molecular ordering.

86. A liquid formulation as in claim 18 wherein the polycarbonate material constitutes largely all the solid dissolved in the liquid.

87. A liquid formulation as in claim 37 wherein the polycarbonate material constitutes largely all the the solid material dissolved in the liquid.

88. A liquid formulation as in claim 48 wherein the polycarbonate material constitutes largely all the solid material dissolved in the liquid.

89. A liquid formulation as in claim 59 wherein the polycarbonate material constitutes largely all the solid material dissolved in the liquid.

90. A structure as in claim 66 wherein the polycarbonate material constitutes largely all the solid material dissolved in the liquid.

91. A method comprising the steps of:

providing a liquid chemical formulation by a procedure which entails:

dissolving polycarbonate material in a liquid (a) capable of dissolving the polycarbonate material to a concentration of at least 1% by mass of the liquid formulation at 20° C. and 1 atmosphere and (b) having a boiling point of at least 80° C. at 1 atmosphere; and drying the polycarbonate material and/or the liquid to remove water;

forming a liquid film of the liquid formulation over a substructure; and processing the liquid film to largely remove the liquid and convert the polycarbonate material in the liquid film into a solid film.

92. A method as in claim 91 wherein the forming step comprises spin coating at least part of the liquid formulation over the substructure.

93. A method comprising the steps of:

providing a liquid chemical formulation created by dissolving polycarbonate material in a liquid (a) capable of dissolving the polycarbonate material to a concentration of at least 1% by mass of the liquid formulation at 20° C. and 1 atmosphere and (b) having a boiling point of at least 80° C. at 1 atmosphere;

forming a liquid form of the liquid formulation over a substructure by spin coating at least part of the liquid formulation over the substructure; and processing the liquid film to largely remove the liquid and convert the polycarbonate material in the liquid film into a solid film.

94. A method comprising the steps of:

providing a liquid chemical formulation by a procedure which entails dissolving polycarbonate material in a liquid (a) capable of dissolving the polycarbonate material to a concentration of at least 1% by mass of the liquid formulation at 20° C. and 1 atmosphere and (b) having a boiling point of at least 80° C. at 1 atmosphere;

forming a liquid film of the liquid formulation over a substructure; and processing the liquid film to largely remove the liquid and convert the polycarbonate material in the liquid film into a solid film, the polycarbonate material being characterized by a glass transition temperature $T_g$, the processing comprising drying the liquid film at a maximum temperature no more than approximately 15° C. above $T_g$.

95. A method as in claim 94 wherein the maximum temperature during the drying step is less than $T_g$.

96. A method comprising the steps of:

providing a liquid chemical formulation by a procedure, performed in a substantially water-free environment, which entails dissolving polycarbonate material in a liquid comprising at least one of pyridine, a ring-substituted pyridine derivative, pyrrole, a ring-substituted pyrrole derivative, pyrrolidine, a pyrrolidine derivative, and cyclohexanone;

forming a liquid film of the liquid formulation over a substructure; and processing the liquid film to largely remove the liquid and convert the polycarbonate material in the liquid film into a solid film.

97. A method comprising the steps of:

providing a liquid chemical formulation created by dissolving polycarbonate material in a liquid comprising at least one of pyridine, a ring-substituted pyridine derivative, pyrrole, a ring-substituted pyrrole derivative, pyrrolidine, a pyrrolidine derivative, and cyclohexanone;

forming a liquid film of the liquid formulation over a substructure by spin coating at least part of the liquid formulation over the substructure in a substantially water-free environment; and processing the liquid film to largely remove the liquid and convert the polycarbonate material in the liquid film into a solid film.

98. A method comprising the steps of:

providing a liquid chemical formulation by a procedure which entails dissolving polycarbonate material in a liquid comprising at least one of pyridine, a ring-substituted pyridine derivative, pyrrole, a ring-substituted pyrrole derivative, pyrrolidine, a pyrrolidine derivative, and cyclohexanone;

forming a liquid film of the liquid formulation over a substructure; and processing the liquid film to largely remove the liquid and convert the polycarbonate material in the liquid film into a solid film such that the polycarbonate material is converted from a glass-like microstructure having some short-range molecular ordering to a microstructure having largely no short-range or long-range molecular ordering.

* * * * *